US006138056A

United States Patent [19]

Hardesty et al.

[11] Patent Number: 6,138,056

[45] Date of Patent: Oct. 24, 2000

[54] SYSTEM AND METHOD FOR MAINTENANCE AND REPAIR OF CNC MACHINES

[75] Inventors: Michael P Hardesty, Dale; Kenneth J. Susnjara, Santa Claus, both of Ind.

[73] Assignee: Therwood Corporation, Dale, Ind.

[21] Appl. No.: 09/032,855

[22] Filed: Mar. 2, 1998

[51] Int. Cl.[7] .......... G06F 19/00

[52] U.S. Cl. .......... 700/174; 409/194; 408/11; 483/11

[58] Field of Search .......... 700/79, 80, 174, 700/177, 180, 175, 179, 195; 702/184, 177; 706/911, 912; 409/194, 193, 80; 408/11; 483/11; 83/62.1

[56] References Cited

U.S. PATENT DOCUMENTS

| | | | |
|---|---|---|---|
| 4,208,718 | 6/1980 | Chung | 700/173 |
| 4,351,029 | 9/1982 | Maxey et al. | 702/34 |
| 4,456,960 | 6/1984 | Wakai | 700/175 |
| 5,428,547 | 6/1995 | Ikeda | 700/174 |
| 6,021,360 | 2/2000 | Barker et al. | 700/174 |

*Primary Examiner*—William Grant
*Assistant Examiner*—Zoila Cabrera
*Attorney, Agent, or Firm*—Lalos & Keegan; Michael N. Lau

[57] ABSTRACT

A system and method are disclosed providing improved maintainability for CNC machine tools with serviceable parts. An electronic manual with video, audio, and textual information is stored in memory on a computer system integrated with the CNC tool control. A first register in computer system memory stores predetermined cycle value for at least one serviceable part. A service clock accumulates information collected from tool movement data monitored using the CNC machine tool control in a second register. Maintenance events are indicated for at least one serviceable part based on a comparison of first and second register contents. A graphical display with a graphical representation of the CNC machine shows where the maintenance event has occurred and where maintenance is required with an accompanying alarm indication. Such an indication may be a visual alarm indication superimposed on the graphical display in proximity to location of maintenance event. Text, video, and audio information and instructions representative of steps involved in maintenance event are retrieved from the electronic manual in response to an alarm indication and displayed on a computer screen including a graphical display. Information from the electronic manual is further accessed in a general access mode for training or general information purposes using Hypertext link search.

44 Claims, 21 Drawing Sheets

Figure 6:
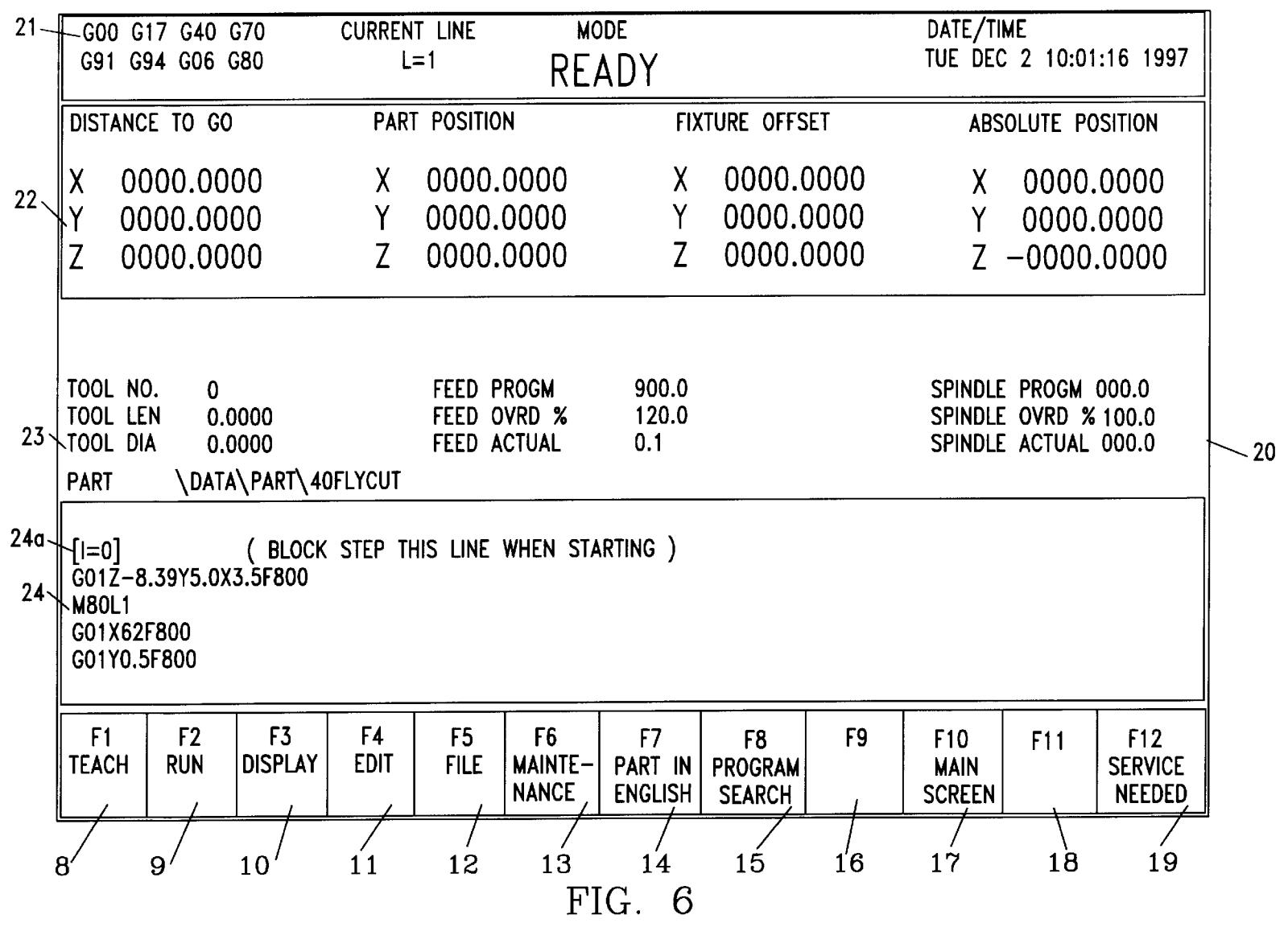

G00 G17 G40 G70
G91 G94 G06 G80

CURRENT LINE
L=1

MODE
READY

DATE/TIME
TUE DEC 2 10:01:16 1997

| DISTANCE TO GO | PART POSITION | FIXTURE OFFSET | ABSOLUTE POSITION |
|---|---|---|---|
| X 0000.0000 | X 0000.0000 | X 0000.0000 | X 0000.0000 |
| Y 0000.0000 | Y 0000.0000 | Y 0000.0000 | Y 0000.0000 |
| Z 0000.0000 | Z 0000.0000 | Z 0000.0000 | Z -0000.0000 |

TOOL NO. 0
TOOL LEN 0.0000
TOOL DIA 0.0000

FEED PROGM 900.0
FEED OVRD % 120.0
FEED ACTUAL 0.1

SPINDLE PROGM 000.0
SPINDLE OVRD % 100.0
SPINDLE ACTUAL 000.0

PART \DATA\PART\40FLYCUT

[I=0] ( BLOCK STEP THIS LINE WHEN STARTING )
G01Z-8.39Y5.0X3.5F800
M80L1
G01X62F800
G01Y0.5F800

| F1 TEACH | F2 RUN | F3 DISPLAY | F4 EDIT | F5 FILE | F6 MAINTE-NANCE | F7 PART IN ENGLISH | F8 PROGRAM SEARCH | F9 | F10 MAIN SCREEN | F11 | F12 SERVICE NEEDED |
|---|---|---|---|---|---|---|---|---|---|---|---|

MAINTENANCE
CLOCKS
FLOW CHARTS

MAINTENANCE
CLOCKS
FLOW CHARTS

THERMWOOD'S MODEL 67

SERVICES OPTIONS HELP

MAINTENANCE MENU

MAINTENANCE

M-EXAMPLE MOVIE

SAFETY
DRIVE SYSTEM
LUBRICATION
AIR PURGE LUBRICATION SYSTEM
BELTS AND DRIVES
M REPLACE A BELT
M
M
L
M
M
B
M
M
M

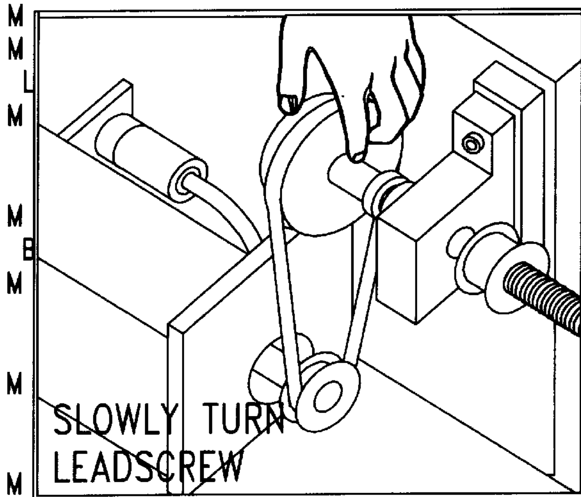

REALIGNING THE C-MARKER

TURN THE MAVHINE OFF AND LOCK OUT THE ELECTRICAL DISCONNECT.

LOOSEN THE MOTOR BOLTS AND LOOSEN THE BELT. WITH THE LEAD SCREW PULLEY IN THE POSITION MARKED IN THE PREVIOUS STEP, REPOSITION THE MOTOR PULLEY SO THAT THE PULLEY MUST TURN ABOUT NINETY DEGREES BEFORE THE C-MARKER OCCURS. TIGHTEN THE BELT, APPLY LOCKTITE REMOVABLE THREADLOCKER242 OR EQUIVALENT TO THE BOLTS AND TIGHTEN THEM WHILE MAINTAINING TENSION ON THE BELT. REINSTALL THE BELT GUARD.

POWER-UP THE MACHINE AND NORMALIZE THE AXIS. THE AXIS SHOULD MOVE TOWARD THE HOME SWITCH. WHEN REACHING THE HOME SWITCH IT SHOULD BEGIN TO DECELERATE LOOKING FOR THE C-MARKER. IT CONTINUES PAST THE C-MARKER UNTIL IT COMES TO A STOP. IT THEN REVERSES DIRECTION AND RETURNS TO THE C-MARKER OR HOME POSITION. IF IT DOES NOT ENCOUNTER A C-MARKER DURING DECELERATION, AN "ERROR 1500" WILL OCCUR. TO CLEAR THE ERROR, HIT ENTER. READJUST THE C-MARKER UNTIL IT OPERATES PROPERLY.

☐ COMPLETE REALIGNMENT OF THE C-MARKER

FIG. 16

```
/*MACHINE.RC*/

#define incl-PM
#include<os2.h>
#include */"system\mmc.h"

/*-----Model 40 Single Table Machine.RC------*/

BITMAP ID_MACHINE\system\bitmaps\model-40\C40-1.bmp

/*     Customer's Name:        */
*/     Job Number:            */

*/------BITMAP ID SECTION-----*/

BITMAP ID_EVENT1\SYSTEM\BITMAPS\MODEL-40\c40-1\C40-AcfILTER.BMP
BITMAP ID_EVENT2\SYSTEM\BITMAPS\MODEL-40\c40-1\C40-Regulator.bmp
BITMAP ID_EVENT3\SYSTEM\BITMAPS\MODEL-40\c40-1\C40-XTrackwaysZ.bmp
BITMAP ID_EVENT4\SYSTEM\BITMAPS\MODEL-40\c40-1\C40-YTrackways.bmp
BITMAP ID_EVENT5\SYSTEM\BITMAPS\MODEL-40\c40-1\C40-ZSlide.bmp
BITMAP ID_EVENT6\SYSTEM\BITMAPS\MODEL-40\c40-1\C40-ZLeadscrew.bmp
BITMAP ID_EVENT7\SYSTEM\BITMAPS\MODEL-40\c40-1\C40-XLeadscrew.bmp
BITMAP ID_EVENT8\SYSTEM\BITMAPS\MODEL-40\c40-1\C40-YLeadscrew.bmp
BITMAP ID_EVENT9\SYSTEM\BITMAPS\MODEL-40\c40-1\C40-ZBallnut.bmp
BITMAP ID_EVENT10\SYSTEM\BITMAPS\MODEL-40\c40-1\C40-GreaseMotor.bmp
BITMAP ID_EVENT11\SYSTEM\BITMAPS\MODEL-40\c40-1\C40-XTrackways.bmp
BITMAP ID_EVENT12\SYSTEM\BITMAPS\MODEL-40\c40-1\C40-YTrackways.bmp
BITMAP ID_EVENT13\SYSTEM\BITMAPS\MODEL-40\c40-1\C40-ZSlide.bmp
```

FIG. 17

```
********************HOT SPOT DEFINETION SECTION*************



STRINGTABLE
BEGIN

HOTSPOT1 "TOOLINGLOCKOUT SWITCH OR SIEMENS IR MODULE FAULT @585,324,660,116"
HOTSPOT2 "SIEMENS FEED MODULE @660,116
HOTSPOT3 "AIR PRESSURE LOW OR ROUTER OVERLOAD @286,476,555,178"
HOTSPOT4 "FOLLOWING ERROR X AXIS @464,272"
HOTSPOT5 "FOLLOWING ERROR Y AXIS @389,264"
HOTSPOT6 "FOLLOWING ERROR Z AXIS @324,407"
HOTSPOT7 ""
HOTSPOT8 "24 VOLT FUSE @665,195"
HOTSPOT9 ""
HOTSPOT10 ""
HOTSPOT11 ""
HOTSPOT12 ""
HOTSPOT13 ""
HOTSPOT14 ""
HOTSPOT15 ""
HOTSPOT16 ""
HOTSPOT17 ""
HOTSPOT18 ""
HOTSPOT19 ""
HOTSPOT20 ""
HOTSPOT21 ""
HOTSPOT22 ""
HOTSPOT23 ""
HOTSPOT24 ""
HOTSPOT25 ""
HOTSPOT26 ""
HOTSPOT27 ""
HOTSPOT28 ""
HOTSPOT29 ""
HOTSPOT30 ""
HOTSPOT31 ""
HOTSPOT32 ""
```

FIG. 18

```
/************ MCLOCK DEFINITION SECTION**************/

mclock1 "check and Clean the Air Conditioner Filter  @24.0, 1"
mclock2 "Check and Drain the Regulator Water Trap  @9999.9, 1"
mclock3 "Grease the X Axis Trackway Bearings   @9999.9, 1"
mclock4 "Grease Y Axis Trackway Bearings   @9999.9, 1"
mclock5 "Grease Z Axis Slide (Both Sides) @9999.9, 1"
mclock6 "grease z axis thrust bearing   @40.0, 2"

mclock7 "Grease X Axis Ballnut and Leadscrew Bearings   @9999.9, 2"
mclock8 "Grease Y Axis Ballnut and Leadscrew Bearings   @9999.9, 2"
mclock9 "Grease Z Axis Ballnut @9999.9, 2"
mclock10 "Grease US Router Motor   @2080.0, 3"
mclock11 "Clean and Inspect X Axis Rail Bearings for Wear and Damage   @9999.9, 3"
mclock12 "Clean and Inspect  Y Axis Rail Bearings for Wear and Damage  @9999.9, 3"
mclock13 "Clean and Inspect Z Axis Slide Rails for Wear and Damage   @9999.9, 3"
mclock14 ""
mclock15 ""
mclock16 ""
mclock17 ""
mclock18 ""
mclock19 ""
mclock20 ""
mclock21 ""
mclock22 ""
mclock23 ""
mclock24 ""
mclock25 ""

END
```

FIG. 19

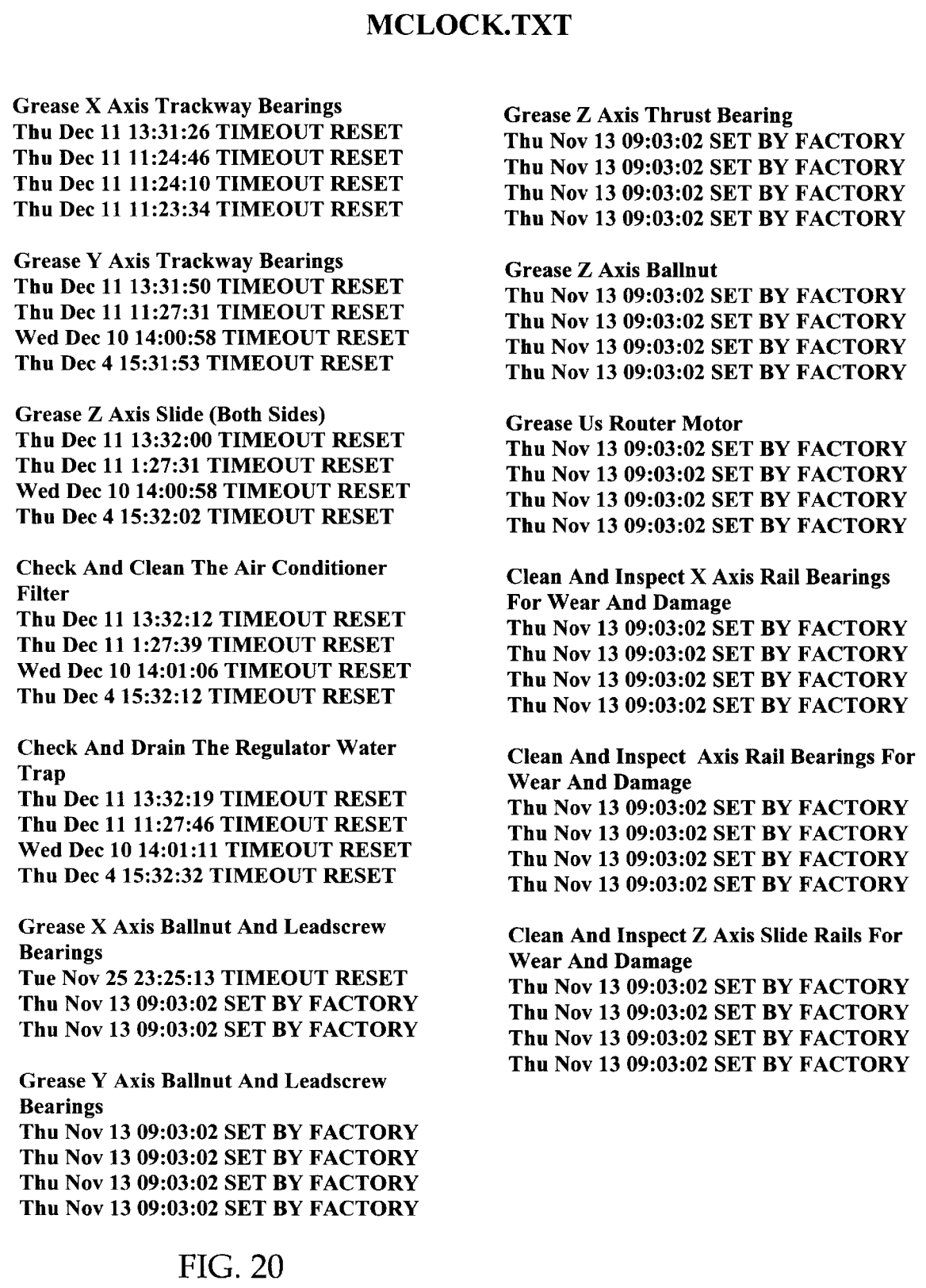

MCLOCK.TXT

Grease X Axis Trackway Bearings
Thu Dec 11 13:31:26 TIMEOUT RESET
Thu Dec 11 11:24:46 TIMEOUT RESET
Thu Dec 11 11:24:10 TIMEOUT RESET
Thu Dec 11 11:23:34 TIMEOUT RESET Grease Y Axis Trackway Bearings
Thu Dec 11 13:31:50 TIMEOUT RESET
Thu Dec 11 11:27:31 TIMEOUT RESET
Wed Dec 10 14:00:58 TIMEOUT RESET
Thu Dec 4 15:31:53 TIMEOUT RESET Grease Z Axis Slide (Both Sides)
Thu Dec 11 13:32:00 TIMEOUT RESET
Thu Dec 11 1:27:31 TIMEOUT RESET
Wed Dec 10 14:00:58 TIMEOUT RESET
Thu Dec 4 15:32:02 TIMEOUT RESET Check And Clean The Air Conditioner Filter
Thu Dec 11 13:32:12 TIMEOUT RESET
Thu Dec 11 1:27:39 TIMEOUT RESET
Wed Dec 10 14:01:06 TIMEOUT RESET
Thu Dec 4 15:32:12 TIMEOUT RESET Check And Drain The Regulator Water Trap
Thu Dec 11 13:32:19 TIMEOUT RESET
Thu Dec 11 11:27:46 TIMEOUT RESET
Wed Dec 10 14:01:11 TIMEOUT RESET
Thu Dec 4 15:32:32 TIMEOUT RESET Grease X Axis Ballnut And Leadscrew Bearings
Tue Nov 25 23:25:13 TIMEOUT RESET
Thu Nov 13 09:03:02 SET BY FACTORY
Thu Nov 13 09:03:02 SET BY FACTORY Grease Y Axis Ballnut And Leadscrew Bearings
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Grease Z Axis Thrust Bearing
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Grease Z Axis Ballnut
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Grease Us Router Motor
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Clean And Inspect X Axis Rail Bearings For Wear And Damage
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Clean And Inspect  Axis Rail Bearings For Wear And Damage
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY Clean And Inspect Z Axis Slide Rails For Wear And Damage
Thu Nov 13 09:03:02 SET BY FACTORY
Thu Nov 13 09:03:02 SET BY FACTORY
Thu Nov 13 09:03:02 SET BY FACTORY
Thu Nov 13 09:03:02 SET BY FACTORY

FIG. 20

/* "EVENT GROUP DEFINITION SECTION" */

| | |
|---|---|
| E group 1 | "1" |
| E group 2 | "2" |
| E group 3 | "3" |
| E group 4 | "4" |
| E group 5 | "5" |
| E group 6 | "6" |
| E group 7 | "7" |
| E group 8 | "8" |

FIG. 21

SYSTEM AND METHOD FOR MAINTENANCE AND REPAIR OF CNC MACHINES

CROSS-REFERENCE TO RELATED APPLICATIONS

The subject matter of the present application is related to co-pending application Ser. No. 08/624,874 entitled: "System for Monitoring CNC Machine Controllers" filed on Mar. 27, 1996.

FIELD OF THE INVENTION

The present invention is in the field of Computer Numerical Control (CNC) machine. In particular, the present invention is a system and method related to the maintenance and repair of a CNC machine.

BACKGROUND OF THE INVENTION

Modern CNC machine controls are more sophisticated and packed with more features than ever before. They are more frequently used to perform a wider variety of jobs. This gives rise to the need for more frequent maintenance work since periodic service intervals or cycle values are reached sooner. Furthermore, there is a lack of consistency of wear between tool parts caused by the wide variety of tool movements possible for any given piece or series of pieces that the tool machines. Since some parts receive more or less wear than others and at varying intervals, difficulties arise in tracking hours of use on a part-by-part basis. Traditional methods of calculating part wear based on gross hours of use for the entire machine are therefore inadequate and inefficient.

Further complicating the task of calculating and tracking wear on machine parts is the difference in measurement units between different types of parts. For certain drive motors, for example, cycle values may be measured in terms of hours, while for other parts such as bearings, tracks and the like, cycle values may be determined by total distance of travel along a track or rail. Electrical contacts may be serviced according to the number of make and break cycles. Maintenance specifications are typically outlined and tracked in a detailed service manual delivered with a CNC machine. An example of such a manual is that of the Thermwood Model 53 CNC machining center from Thermwood Inc., of Dale, Ind., which manual is incorporated herein by reference. Chapter 5 of the Model 53 manual contains detailed service information showing the recommended minimum frequency of lubrication of the listed parts. Further, the Model 53 manual identifies the service points on a detailed diagram of the machine showing the location of points on the machine. Detailed service instructions are also presented.

Although a recommended maintenance schedule can be maintained, tracking the completion of maintenance events, however is left to the user, since, even with recommended lubrication cycle values such as on a daily or weekly basis, parts experiencing more operational travel may need lubrication sooner. Often times however, due to the pressure of making scheduled deliveries and the like, inherent in manufacturing operations, scheduled maintenance events may not be performed or, if performed, may not be properly tracked leading to unnecessary down-times. Further, if maintenance events are not tracked accurately, duplicitous part replacements and maintenance efforts may lead to excessive overall costs of operation of the machine tool.

Scheduled maintenance events must be performed after certain parts have run for a certain number of hours or have accumulated certain distances of travel to avoid premature failure. In such cases, if parts are not serviced after accumulating the predetermined amount of use, failure is imminent. In a typical system, noise, squeaks, vibration, or other telltale symptoms may indicate an impending failure requiring immediate corrective actions. Such warnings, however, may not always be present. Parts may fail spontaneously due to poor lubrication or a lack of adequate maintenance. Such parts may include motors, slides, bearings, electrical contacts and the like. Such parts are in near constant, but variable use, and, therefore, cannot be easily or accurately monitored simply by tracking the hours of aggregate use on the entire machine tool. Using aggregated hours of use on the tool as a measure in determining the maintenance event schedule for individual parts may lead to inefficient maintenance and higher costs, since some parts may have received relatively little use during the aggregate cycle value for the entire tool. If such parts are nevertheless replaced or serviced, unnecessarily higher costs are incurred.

Since the wear on certain parts is dependent on the type of parts being machined, and since a typical CNC machine tool may mill a series of different parts in the course of operation, teach having different demands on the machine's parts, the maintenance event requirements, as described, vary depending on which machine parts accumulate wear first. Tracking the accumulated time on individual components becomes a formidable task.

Further complicating the requirement for servicing inherent in operating a CNC machine tool is the availability of trained personnel to perform the maintenance work. Despite comprehensive manuals detailing the steps in performing certain maintenance event tasks, there is no substitute for live instruction to ensure that steps are performed correctly and that time saving pointers can be given. A manufacturer of CNC machine can provide training and/or trained personnel to a customer but usually only at a premium price. The alternative is for the customers to maintain equipment themselves or to risk equipment breakdowns. By performing unqualified repair or failing to perform scheduled maintenance, manufacturer's warranties may be voided.

Hard copy manuals are inherently easy to misplace or may become damaged or worn. Moreover, indexing through a manual may be time-consuming and may require extensive page turning for each step of what may be a relatively detailed task. Page turning, by technicians with grease, lubricant, or other soil on their hands, may soil manual pages leading to premature degradation of the manual. Attempting repair or maintenance without using the service manual may lead to incomplete or improper maintenance or repair. Even for experienced technicians, the service manual is a crucial reference.

It would be appreciated in the art therefore for a system and method capable of facilitating the performance of key maintenance functions and repairs of failed equipments. Such a system would be integrated into the CNC machine tool and provide the maintenance event support functions and alarm and failure condition monitoring and reporting at a relatively low cost while increasing the operability or "up-time" of the CNC machine tool.

SUMMARY OF THE INVENTION

The system and method of the present invention overcomes the deficiencies of prior art CNC controls by providing an integrated CNC control including an electronic manual having direct and triggered access modes and a service tracking and assist function embodied in the inventive system and method hereinafter described. The CNC control of the present invention includes a computer such as described in the above-mentioned application Ser. No. 08/624,874 entitled: “System for Monitoring CNC Machine Controllers” filed on Mar. 27, 1996 and incorporated herein by reference. The system and method of the present invention are contemplated being practiced on such a system as is described in the incorporated application comprising a computer, having a main processor such as the Intel® 486, Pentium® or like processor, associated computer memory including both primary RAM and ROM and secondary hard drive or like storage such as tape or cartridge storage.

The system of the present invention comprises an electronic manual stored in computer memory to store recommended cycle values, service clocks to determine actual accumulated cycle time, alarms, a video display screen, a graphical display, input and output devices providing a comprehensive, integrated maintenance and repair support facility. The computer and associated memory store detailed information related to the operation, repair, and maintenance specifications for the CNC machine by way of the electronic manual including audio, video, graphics, and text By commonly referred to in the art as multi-media information. The electronic manual may provide such information in a multimedia format on the computer display with text explanations, accompanying instruction videos and even sound instruction. Recommended cycle values for each serviceable part may be stored in registers within system memory. When a fault or maintenance event occurs, the electronic manual is accessed in response thereto in a triggered mode and multi-media information related to the maintenance event is displayed showing repair steps or maintenance procedures and describing the location of related area of the machine. Not only can the manual provide such information in a triggered mode responsive to the occurrence of a maintenance event or a failure condition, such information is provided on a general access basis to any interested user in a direct access mode.

A user may index through the manual in direct access mode using data links known in the art as Hypertext links. Hypertext links are areas of highlighted keywords or text representing pointers to other places in the manual. The links, when clicked by a user, retrieve more detailed or related information. Further, a Hypertext search allows an entire series of Hypertext links to be displayed in response to a search. Hypertext searches allow direct access to the information stored within the system of the present invention for instructional and training purposes or for general information greatly improving the ability of a user to go directly to the desired information in a minimum amount of time.

The CNC control of the present invention further includes service clocks to monitor a CNC machine tool's operation and determine when normal servicing is needed on a per part basis and may also determine if a failure condition exists. Service clocks determine when cycle times have elapsed by constantly monitoring tool position information and translating it into maintenance event parameters for the serviceable parts of the machine on a per part or per event basis. The service clocks are compared against the recommended cycle times for the part and alert the operator through alarms including an alarm indication on the graphical display of the present invention that a maintenance event for the part has occurred. The graphical display comprises a graphical representation of the machine tool highlighted to show where maintenance is needed or where a repair problem has taken place. Typically, a close up graphical representation of the problem area may be displayed. After locating the problem source or assembly related to the maintenance event and maintenance item on the graphical display, the electronic manual may be viewed for information regarding the condition. Input devices are further provided on the display screen in the form of function keys, which may be accessed either with a pointing device such as a mouse or trackball or a keyboard by pressing the corresponding function key. An input device can also be a keyboard with a build-in trackball or other pointing mechanisms. Input devices allow the CNC control of the present invention to perform maintenance tracking of, for example, the time of completion of the repair, the repair person, and any other such information. Input devices further allow the alarm condition to be cleared and the service clocks to be reset.

In the preferred embodiment, actual use of a serviceable part is derived from computer data indicating the movement history of the table in terms of X, Y, and Z coordinates. By analyzing the movement history of the table using the computerized CNC machine tool control, data regarding wear on individual serviceable parts may be derived therefrom. In the preferred By embodiment, data corresponding to actual use for a serviceable part is accumulated in registers associated with service clocks. Such data, again, is derived from movement data for the table and tracked in registers on a per part basis. When a value is reached, an alarm indication can be displayed with a corresponding call to the electronic manual for retrieving information related to the component requiring service.

For example, table movement data may indicate that a trackway bearing on the CNC machine tool table has accumulated sufficient travel to meet or exceed predetermined travel limits. The service clocks for the bearing perform a comparison of actual accumulated values on the part, as a function of gross table movement, as compared to stored limit values. When accumulated values exceed the limit values, thus indicating the need for lubrication, an alarm indication will be shown and the graphic display will indicate the location of the trackway bearing and the type of alarm. Responsive to the alarm condition, the computer will access the electronic manual to retrieve and display information related to the alarm condition and the location of the trackway bearing showing a detailed view of that portion of the machine including “see through” views. Instructional video and audio are available to guide a repair person through appropriate actions to access the trackway bearing and provided the necessary lubrication. Input devices associated with the Maintenance Schedule screen allow the completion of the repair or maintenance to be registered and recorded at which time the alarm condition is cleared.

BRIEF DESCRIPTION OF THE DRAWINGS

FIG. 6 is an illustration of the main data screen of the CNC machine tool control of the present invention.

FIG. 16 shows an illustration of an audio/video display showing repair instructions of the CNC machine tool control of the present invention.

FIG. 17 shows by way of an example a Bitmap Idenditification section of a program.

FIG. 18 shows by way of an example a hotspot definition section of a program.

FIG. 19 shows by way of an example a Mclock definition section of a program.

FIG. 20 shows by way of an example a plurality of texts of the Mclock.

FIG. 21 shows by way of an example an event group definition section of a program.

DETAILED DESCRIPTION OF THE INVENTION

The system and method of the present invention is based upon a computer-based CNC machine tool control such as that described in application Ser. No. 08/624,874, previously incorporated by reference. The system and method of the present invention greatly improve the maintenance function of a computer-based CNC machine tool control by making available at the control display, detailed information in the form of an electronic manual provided on a display screen 20.

Figure 1:
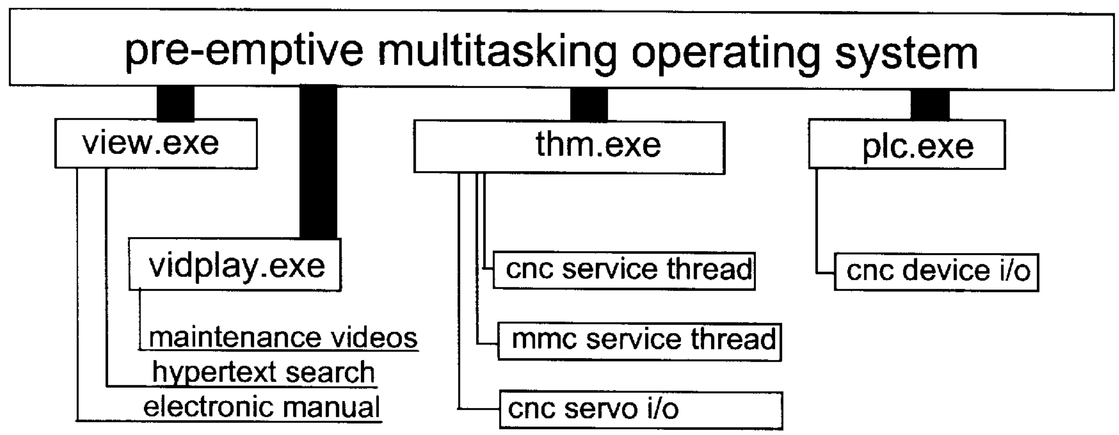
FIG. 1 shows a diagram illustrating a functional overview of an electronic online documentation.

Referring now to the drawings, FIG. 1 shows an electronic online documentation functional overview. As mentioned above, the computer involved functions in a multi-tasking operating environment. Therefore, the computer monitors the various execution files while handling a main task at the same time, such as controlling a machine operation. Upon the triggering of any predetermined event, the computer pre-emptively invokes any relevant execution files, such as those shown in this diagram.

Figure 2:
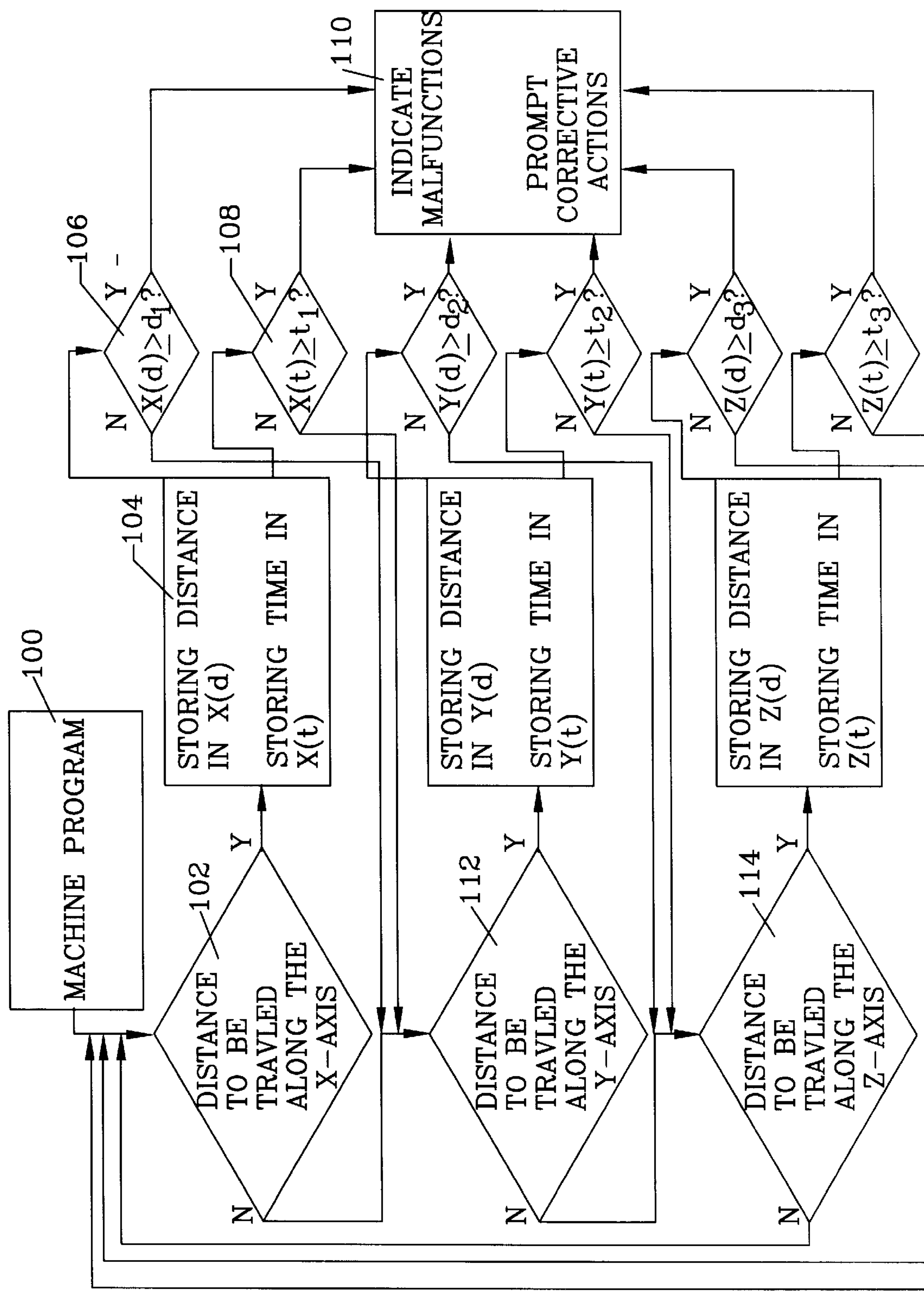
FIG. 2 shows a logic diagram illustrating a principle of the present invention, which is implemented through a machine program and a predetermined threshold method.

FIG. 2 illustrates a method of monitoring the working condition of a CNC machine, thus determine whether maintenance work is needed. This method discloses using a machine program as a way to determine whether maintenance work should be performed. As it is well know, a CNC machine program is used to direct a CNC machine to perform certain works on a workpiece. Typically, the machine is given the information of the initial cutting location, final cutting location, feed speed, depth of cut, and the cutting path. From these general information, the specific information regarding the distances the cutting tool must cover, the operation time of the cutting tools, and the revolution per minute (RPM) of a motor can be obtained. Other ancillary information such as the amount of dust particulates that need to be transported by a vacuum system, the temperature range of the machine, and the ambient temperature of a working environment that is controlled by an air conditioner can also be obtained. From all of these information, a maintenance schedule can be devised. The maintenance schedule should indicate how often should moveable parts such as a trackway and ball bearings be greased, how often should a motor be oiled, how often should belts be changed, and how often should air filters be changed, etc. Some maintenance schedules should be measured and kept by the amount of usage; such as after how many feet of travel a tool must made along a certain axis before greasing is needed. Other maintenance schedules should be measured and kept by the amount of time of usage, such as how many hours of running should a motor be oiled. All of these information can be obtained directly from the machine program that instructs a CNC machine what to do.

Machine Program 100 represents a computer running a particular machine program. The program contains all the appropriate information pertaining to different aspects of the machine operation. An algorithm then deciphers specific information from the machine program and stores them in a memory. Step 102 is shown to extract information directing a machine part to travel a distance for a period of time along the X-axis. The distance to be traveled is then accumulatively stored in a file X(d). Similarly, the total time it takes to travel such a distance is accumulatively stored in a file X(t), as shown in step 104. From imperative data, an operator may know how often should maintenance work be performed. The threshold value may be a reflection of the total distance traveled or total running time of machine operation. The distance threshold is designated as $d_1$ and the time span threshold is designated as $t_1$. In step 106, the content of file X(d) is compared with distance threshold $d_1$. If the content of X(d) is less than $d_1$, this means the cutting tool has not yet traveled sufficient distance along the X-axis to require any maintenance work. However, if the content of X(d) is greater than or equivalent to $d_1$, then there will be an indication on a display that maintenance work is required, as shown in step 110. In step 108, a comparison is made between the content of X(t) and $t_1$. If the content of X(t) is less than $t_1$, then this means insufficient amount of operation time along the X-axis has elapsed to require maintenance work. However, if the content of X(t) is greater than or equivalent to $t_1$, then there will be an indication on a display that maintenance work is required, as shown in step 110.

Once detection of X-axis machine command is completed, the algorithm continues to the next aspect of the machine, such as the Y-axis shown in step 112 and Z-axis shown in step 114. In each of these axes, the same processes as discussed in steps 104, 106, 108 and 110 are repeated, except the relevant data are stored in different files and the distance thresholds as well as the time span thresholds are different. For the Y-axis, the distance storage file is Y(d), the distance threshold is designated as $d_2$, the operational time is stored in Y(t), and the time span threshold is designated as $t_2$. For the Z-axis, , the distance storage file is Z(d), the distance threshold is designated as $d_3$, the operational time is stored in Z(t), and the time span threshold is designated as $t_3$.

Figure 3:
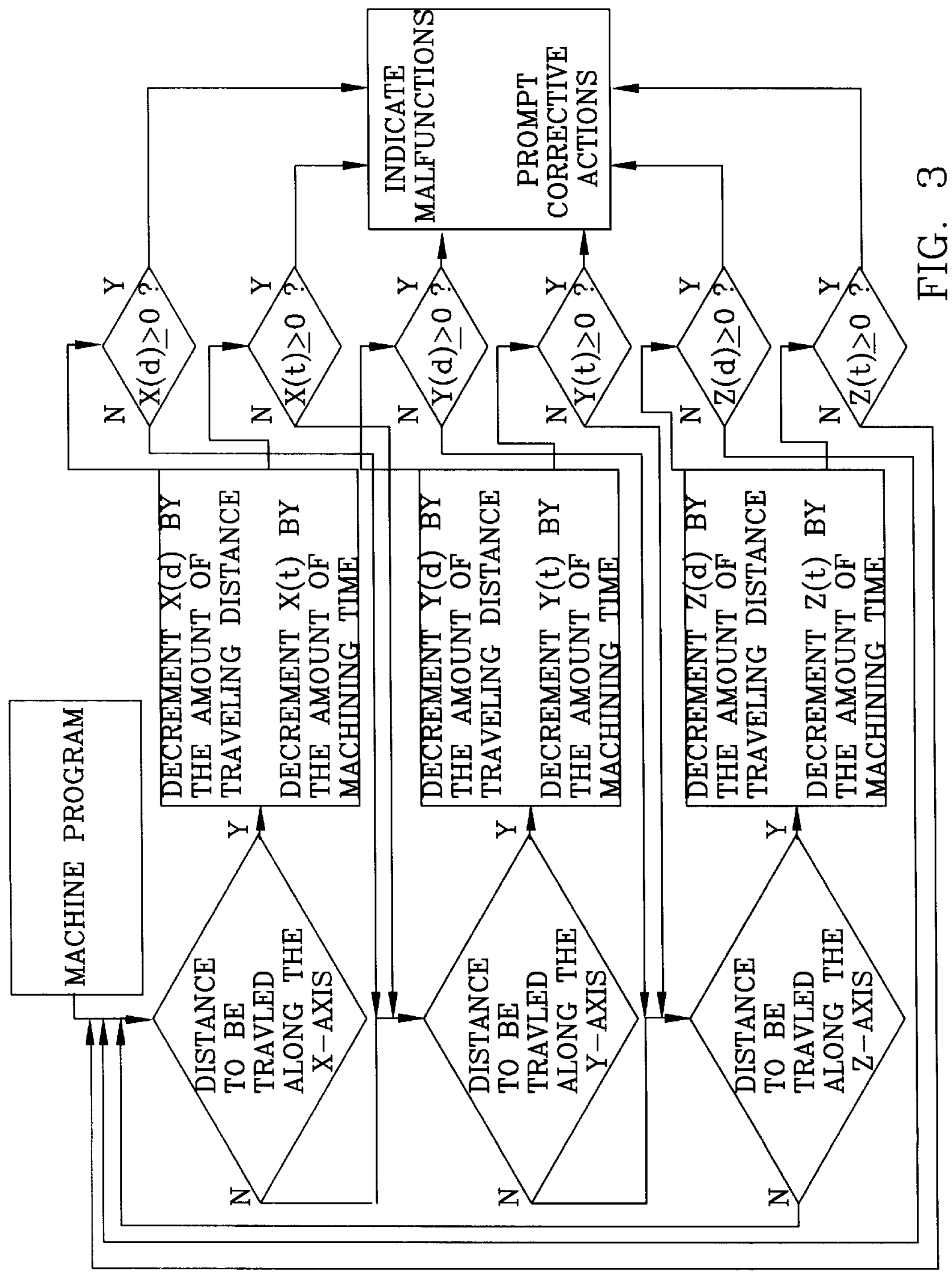
FIG. 3 shows a logic diagram illustrating a principle of the present invention, which is implemented through a machine program and a decrement counter method.

FIG. 3 discloses another method of monitoring machine operations that is substantially the same as that disclosed in FIG. 2. The only difference is that instead of using an incremental method of accumulating distance and time, a decremental method is used. Specifically, the predetermined time and distance thresholds are stored in corresponding registers. Distance to be traveled and time span of machine operation will be accumulatively subtracted from corresponding registers. Once the register contents are either less than or equivalent to zero, then an operator will be notified that maintenance work is due.

Figure 4:
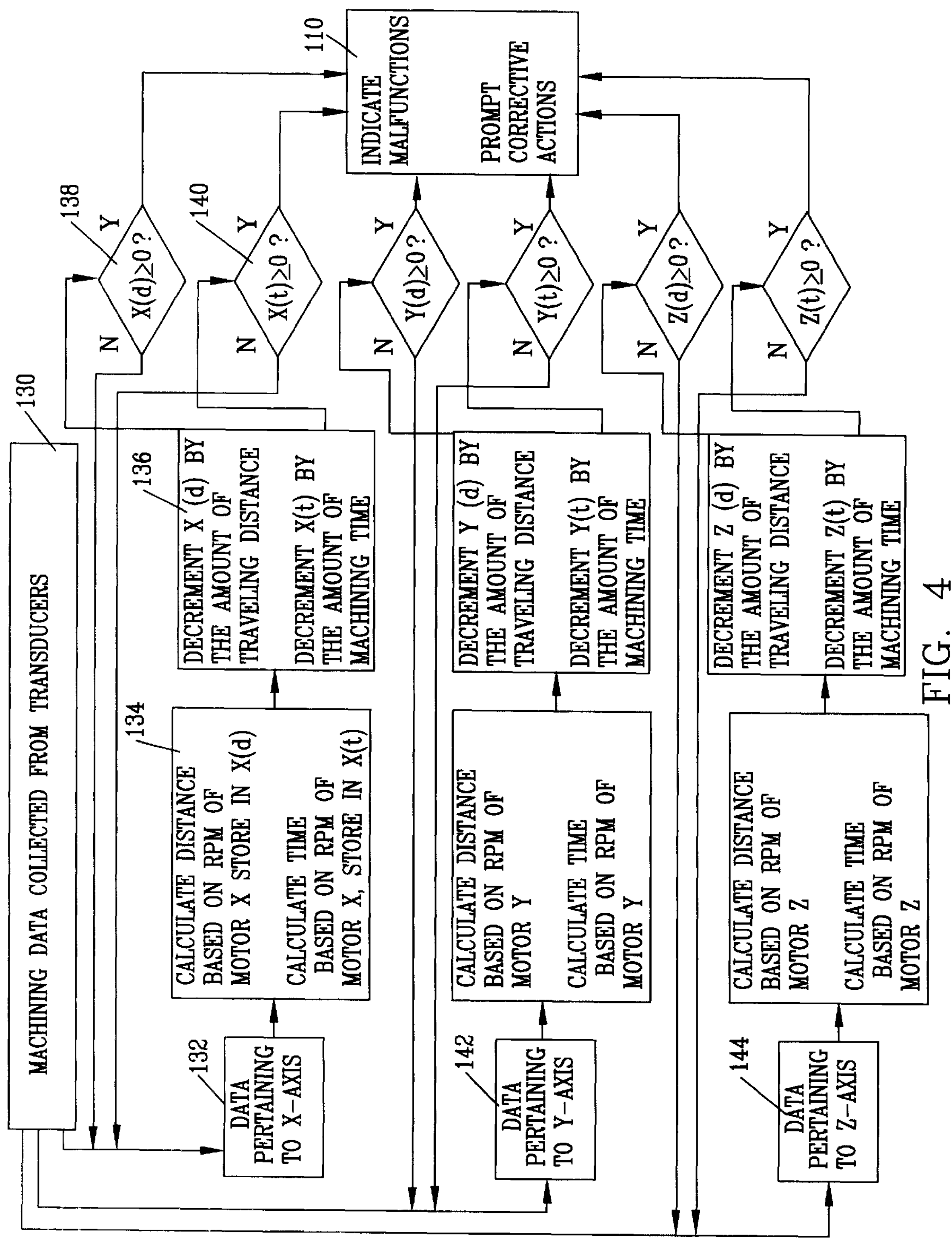
FIG. 4 shows a logic diagram illustrating a principle of the present invention, which is implemented through data collected through transducers.

FIG. 4 illustrates another method of monitoring machine operation to determine whether maintenance work is needed. Unlike the machine program method disclosed above, this method utilizes machine data collected from actual machine runs. Machine data are collected from transducers detecting the physical operation of the machine. An example of a transducer is a rotary encoder, Model #153/121-1250c-BR distributed by Dynamics Research Corporation of 60 Concord Street, Wilmington, Mass. 01887. It can be used to detect the number of rotations of running motors that are used to drive moving parts along X, Y, and Z axes as shown in step 130. The relevant data of X-axis, Y-axis, and Z-axis are stored in memory devices as shown in steps 132, 142 and 144, respectively. For the X-axis, based on the gear ratio of movement transmissions and the RPM of the motor, actual traveling distances can be calculated. Based on the same data, machine operation times can also be calculated, as shown in step 134. The calculated distance and time are to be accumulatively subtracted from predetermined threshold values stored in files X(d) and X(t), respectively, as shown in step 136. Once X(d) or X(t) reaches zero or below, then warning signals will be given to a machine operator, as shown in steps 138, 140 and 110. For the Y and Z-axes, the data will be stored in different files as shown in steps 142 and 144. Thereafter, they go through the same processes as that of the X-axis.

Figure 5:
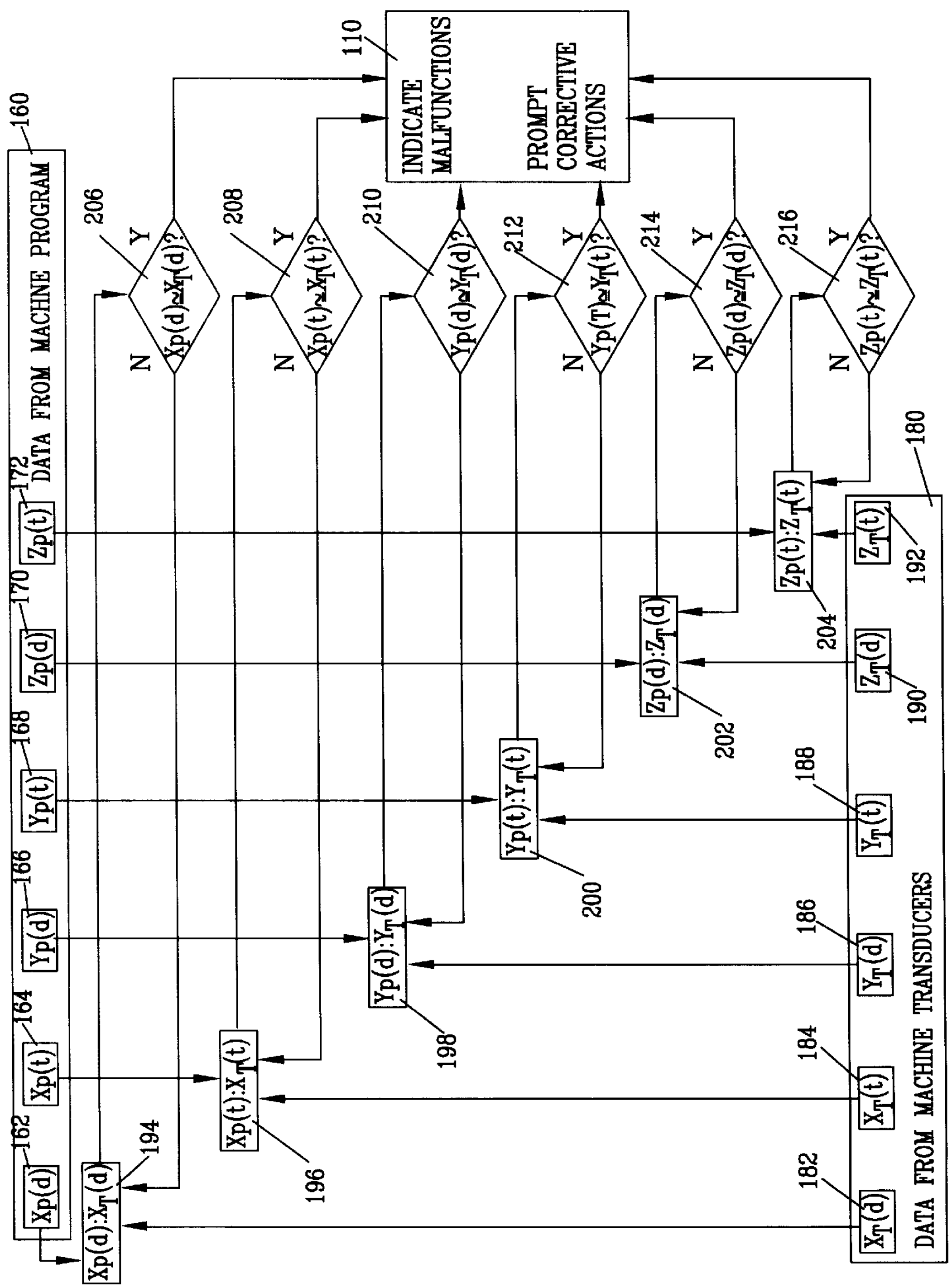
FIG. 5 shows a logic diagram illustrating a principle of the present invention, which is implemented through a combination of machine program data and data collected from transducers.

FIG. 5 illustrates yet another method of monitoring the working condition of a CNC machine. Basically, this method compares data obtained from a machine program and data obtain from transducers monitoring actual machine runs. Should there be sharp discrepancies between these data, an operator is notified of possible machine malfunctions. There is shown a storage device 160 comprising a plurality of data files 162, 164, 166, 168, 170, and 172. Each of these files contains relevant data obtained from the machine program. 162 is shown to contain distance data for the X-axis. 164 is shown to contain time data for the X-axis. 166–172 merely contain similar distance and time data pertaining to the Y and Z-axes. There is shown a storage device 180 containing a plurality of files 182, 184, 186, 188, 190 and 192. Each of these files contains data obtained from actual machine runs in compliance with the instructions of the machine program. File 182 is shown to contain distance data for the X-axis. File 184 is shown to contain time data for the X-axis. Files 186, 188, 190 and 192 merely contain similar types of data pertaining to Y and Z-axes.

Once these data are obtained, comparators 194, 196, 198, 200, 202 and 204 are used to compare whether data obtained from the machine program substantially agree with data obtained from transducers detecting actual machine runs. If comparators 206, 208, 210, 212, 214 and 216 determined that program data and transducer data do not agree with each other within an acceptable range, then an operator is notified of such discrepancy as shown in 110. Ideally, program data and transducer data should be exactly the same. However, in actual implementations, there is always a slight discrepancy between them. This discrepancy may be due to wear and tear of machine parts, thermal expansion due to friction associated with cutting, vibration of moving parts, and any number of other factors. This discrepancy may be assigned a tolerance value $\xi$. The program data $\pm\xi$ is the range that the transducer data must not exceed the boundaries thereof. This should be readily understandable to a person of ordinary skill in the art.

Even though FIGS. 2–5 only discuss detail operational data pertaining to X, Y, and Z-axes, these are not meant to be restrictive. Operational data pertaining to other parts or aspects of the CNC machine can also be monitored in similar fashions. Other parts may include cutting tools, motor belts, machine alignments, vacuum system, etc. Basically every aspect of the machine that is operated under the instruction of machine data can be implemented into the maintenance schedule as disclosed. In fact, some aspects of the machine that are not directly controlled by the machine data can also be implemented into the disclosed maintenance system. For example, an air conditioner operates independently of a CNC machine. However, knowing that the air conditioner must lower the ambient temperature of the workspace by so many degrees per work-shift. An air conditioner maintenance schedule can be derived by the number of operation hours of the CNC machine, such as performing air conditioner maintenance work every 1,000 machine operation hours.

Regarding FIG. 6, display screen 20 in the main operating mode displays a data screen containing a general information area 21, a tool location area 22, a status bar area 23, a program screen area 24 and a cursor/execution line **24*a* and function keys 8 through 19. Function keys 8 through 19 may be operated by pressing corresponding keyboard counterparts or may be accessed without a keyboard by "pointing" to the software controlled buttons on the display screen by using a mouse, trackball, or other such pointing devices well known in the art. In the preferred embodiment, a trackball is used although not shown. As the tool bit progresses throughout its programmed path, position coordinates are tracked in tool location area 22** and the values stored in computer memory. Since the recommended intervals between maintenance events for serviceable parts of the machine tool of the present invention may be in hours, distance, contact closures, etc., derivation of the cycle value quantity may be performed or, alternatively, the cycle value may be tracked directly by service clocks.

Figure 7:
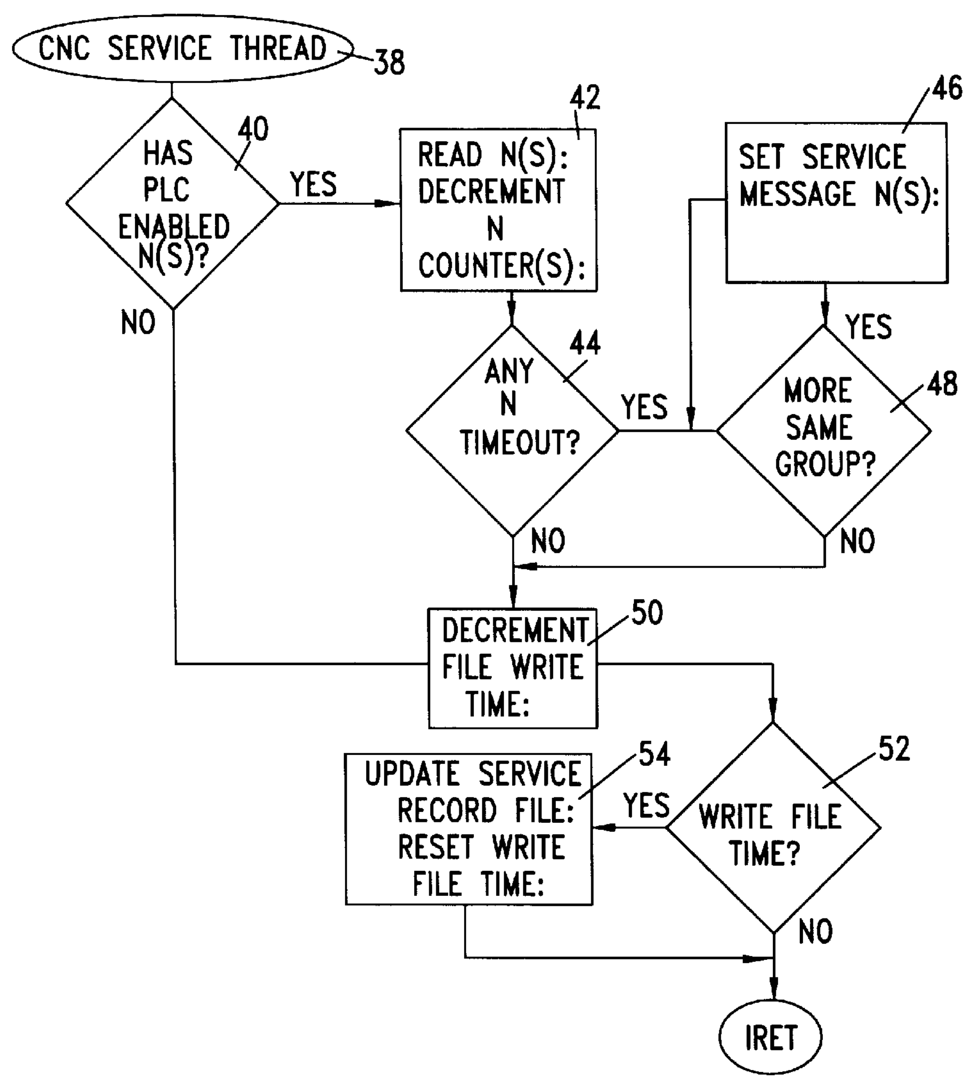
FIG. 7 shows a flow-chart of a CNC Service thread related to maintenance clocks.
Figure 8:
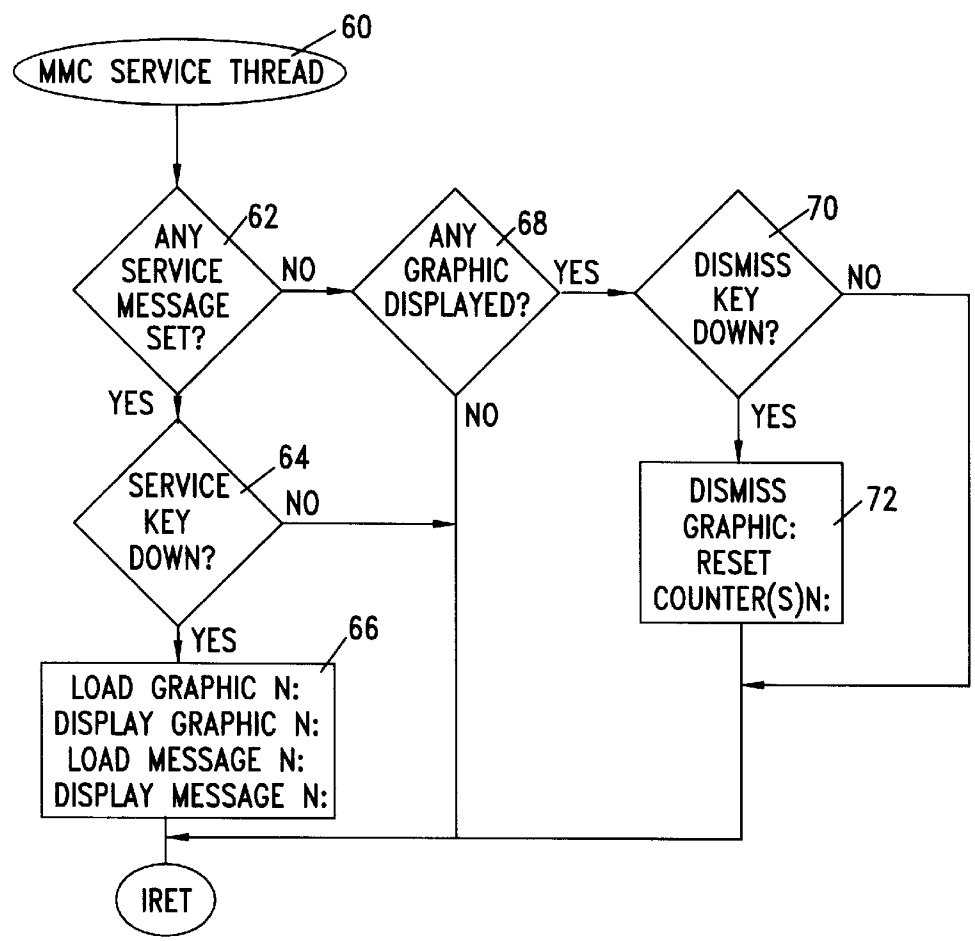
FIG. 8 shows a flow-chart of a MMC Service thread related to maintenance clocks.

More specifically about the Service Clock, two flow-chart diagrams are shown in FIGS. 7–8. The cnc service thread as shown in step 38, is run every 32 milliseconds. The PLC (Programmable Logic Controller) shared memory is checked to see if any service events are enabled as shown in step 40. If any event is enabled, the clock for that event is decreased by the amount of time that has elapsed since the previous inspection, as shown in step 42. After decreasing a clock n(s), if its value is equal to or less than zero, as shown in step 44, a service needed message with the event number is posted to the mmc service thread, as shown in step 46. At this time, the Update File clock is also checked, as shown in step 50. If 30 seconds has passed since the last Service Clock History File, as shown in step 52, the "Mclock.Txt" will be updated as shown in step 54. In addition to the Service Clock History File, there is also a PLC History File. It keeps track of all eave drop events in a file named hist.thm. This allows an operator to trace every history event of the machine.

In FIG. 8, the mmc service thread as shown in step 60, runs every 32 milliseconds, to checks its system queue for a service needed message as shown in step 62. If a message is present, the words "SERVICE NEEDED" are displayed in red on the F12 menu button face. The system queue checks for an F12 key closure indicating that the operator wishes to perform the service as shown in step 64. If no service needed message is present in the queue as shown in step 68, the queue is checked for an F10 key pressed message as shown in step 70. If this message is present, the currently displayed service graphic (if any) will be removed as shown in step 72. The thread will then return from the interrupt. If there is an F12 key closure message in the system queue, the graphic file associated (in the file Machine.Rc) with the event will be loaded from the disk and be displayed. The service instruction message associated (in the file Machine.Rc) with the event will also be loaded and displayed.

After the service has been performed. The operator should press the F10 key. This will cause the graphic to be removed from the display. The "time-out clock" for the event will then be reset to its factory set value.

Figure 9:
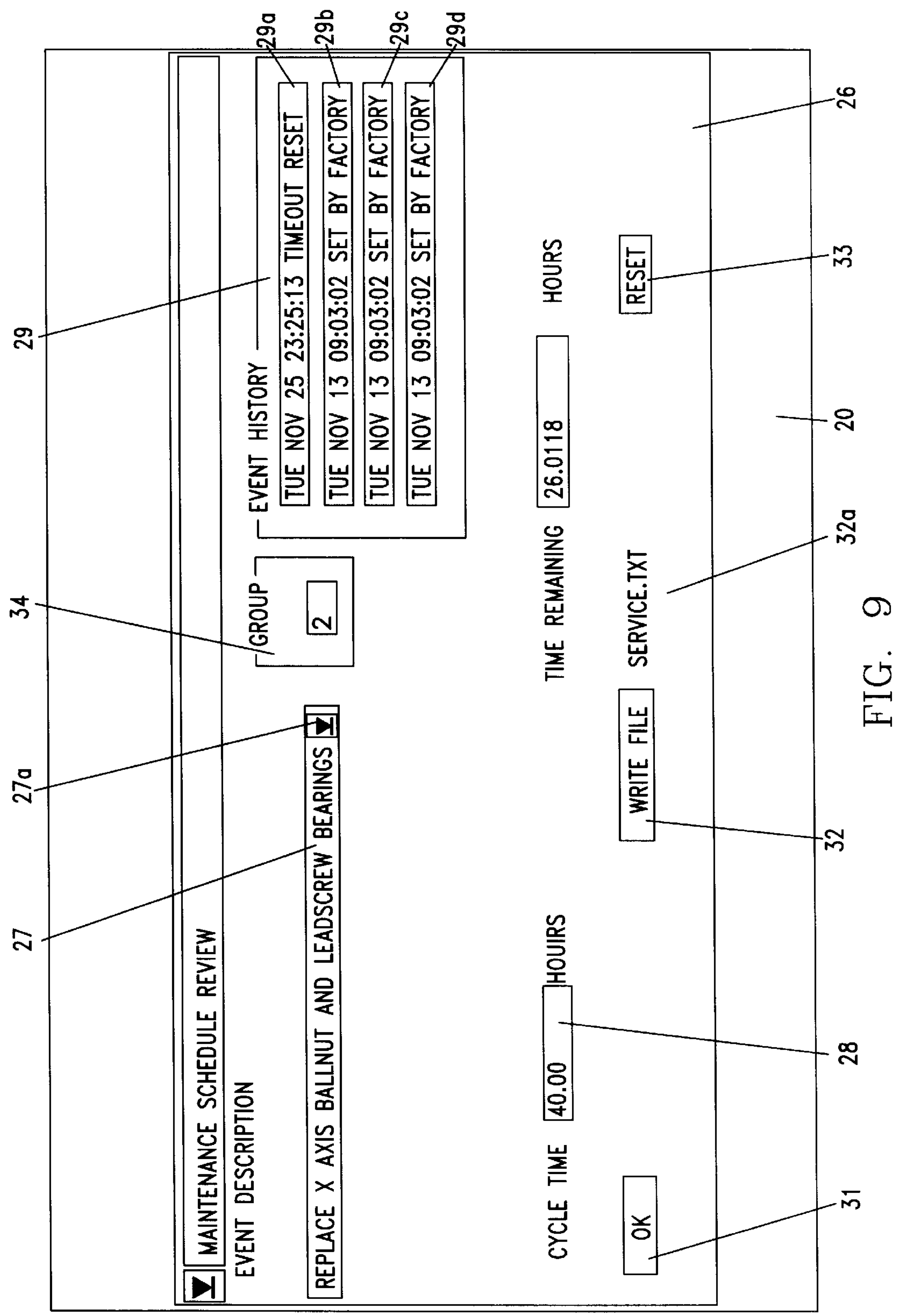
FIG. 9 shows an illustration of a Maintenance Schedule screen

In addition to tracking and accumulating time, distance or like parameters and comparing them against recommended cycle values, the system and method of the present invention also allows the Maintenance Schedule, which contains information such as the recommended cycle values for the part selected in Event Description box 27, to be adjusted using Maintenance Schedule screen 26 as best shown in FIG. 9. The operator can, at any time, inspect the states of all Maintenance Clocks by displaying the Schedule view dialog window. A history of service events and their responses are also available. For more information in this regard, please see the document SCHEDULE VIEW DIALOG, in the service manual.

As shown in FIG. 9, Event Description box 27 displays the current maintenance parameter to be set in terms of the part and action required. Other part/action selections may be made using pull down selection box 27*a*, a well known user interface element which allows other selections to remain hidden until a new selection is desired. By pressing box 27*a*, all possible event selections are displayed and a new Event Description selection may be made.

The recommended cycle time for the part described in Event Description box 27 may be shown in box 28. In the present example, the cycle time is set for 40.00 hours for the X Axis Ballnut and Leadscrew Bearing grease event as shown in Event Description box 27. In addition to recommended cycle time for each event description, event history may also be recorded and displayed showing what action was taken and when it was taken. Event history may be recorded in Event History box 29 and is shown in FIG. 9 as containing the event history for the "Grease X Axis Ballnut and Leadscrew Bearings" event as shown in Event Description box 27. As illustrated, Event History box 29 is filled with the default setting of "Thu Nov 13 09:03:02" indicating the date and time of the last event with the comment "Set by Factory" included. Event History data fields 29*a* through 29*d* are filled with the default setting "Thu Nov 13 09:03:02 Set by Factory", with the exception of most recent event field 29*a* shown containing the entry "Tue Nov 25 23:25:13 TIMEOUT RESET". Field 29*a* signifies that at the more recent time shown, a TIMEOUT RESET occurred indicating that the maintenance was completed for the maintenance event listed in Event Description 27, e.g. the X axis ballnut and leadscrew bearing were greased as required. Pressing RESET button 33 causes a TIMEOUT RESET entry to appear in most recent event field 29*a*. Maintenance Schedule screen 26 further provides a display of the operational time remaining before service is required in Time Remaining box 30, shown in the present example as 26.0118 hours. Pressing RESET button 33 further resets the time in Time Remaining box 30 to the full amount of cycle time listed in Cycle Time box 28, in this case 40 hours. If the information entered in Maintenance Schedule screen 26 is acceptable to the operator, pressing OK button 31 preserves the information on the screen and causes the Maintenance Schedule screen to be replaced with the Main Screen. Newly entered information in the Maintenance Schedule will be valid as long as the machine control remains powered on.

Write Screen button 32 allows the information to be written to a file shown here as "SERVICE.TXT" and stored upon a storage device such as the disk drive provided with the system of the previously incorporated application Ser. No. 08/624,874. Such storage devices are well known in the art and therefore not shown. Upon so doing, information contained in "SERVICE.TXT" will be preserved indefinitely until new information is entered in Cycle Time box 28, and/or a further TIMEOUT RESET is processed and the file is re-written with the new information.

When an accumulated value in a service clock or a distance register meets or exceeds the recommended cycle value stored in a register associated with the electronic manual, a maintenance event is indicated. When a maintenance event is so indicated, graphic display 25 may be shown in display screen 20 illustrating where on the machine the part requiring service is located as shown in FIGS. 10–14.

Figure 10:
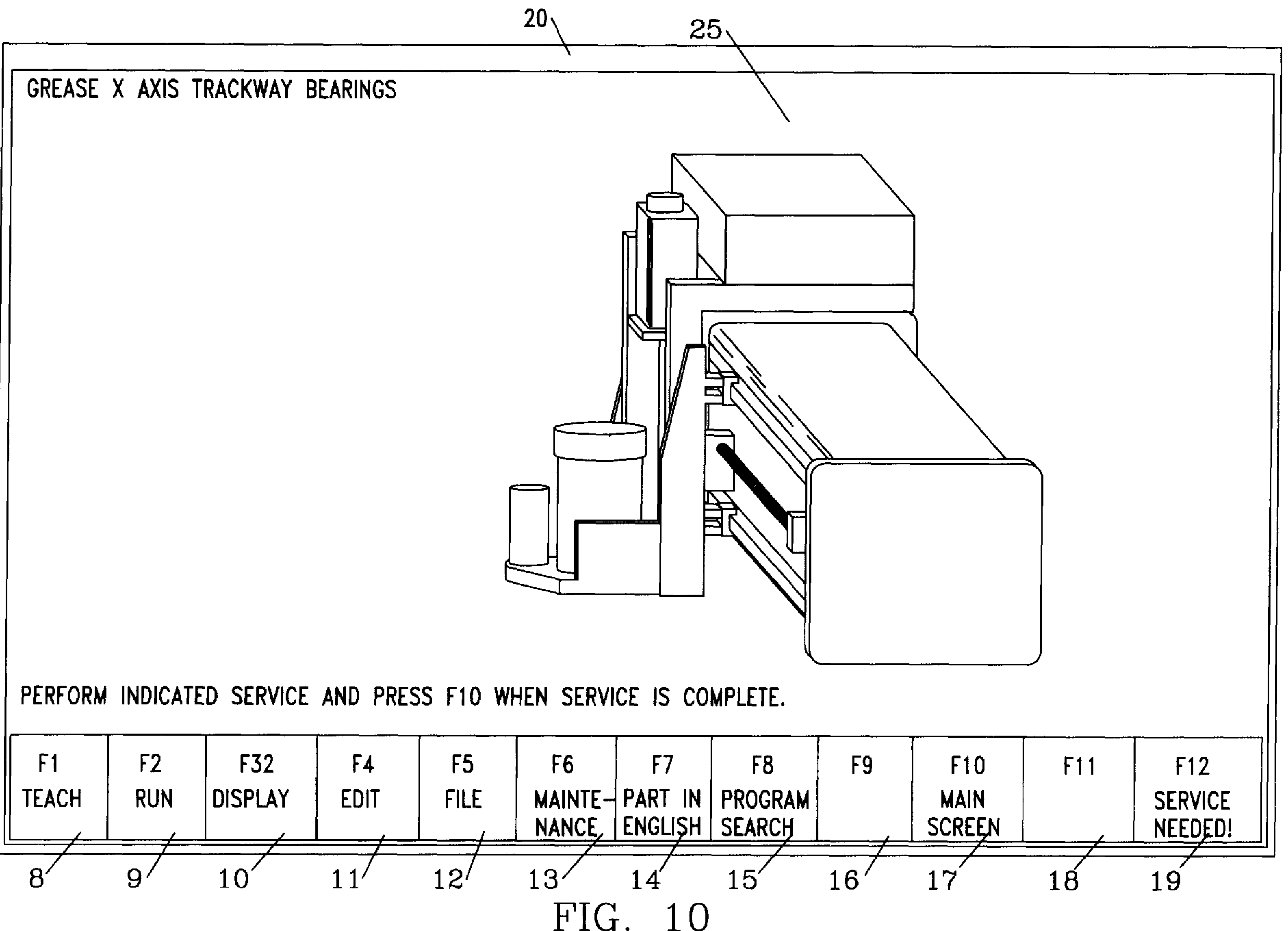
FIG. 10 shows another illustration of a graphical display screen of the CNC machine tool control of the present invention showing the X axis trackway bearings.

FIGS. 10 through 14 show various graphical displays 25 for different parts of the machine tool of the present invention. In FIG. 10, the X Axis Trackway Bearing locations are shown in graphics 25 on display screen 20 for the purpose of applying grease thereto.

Figure 11:
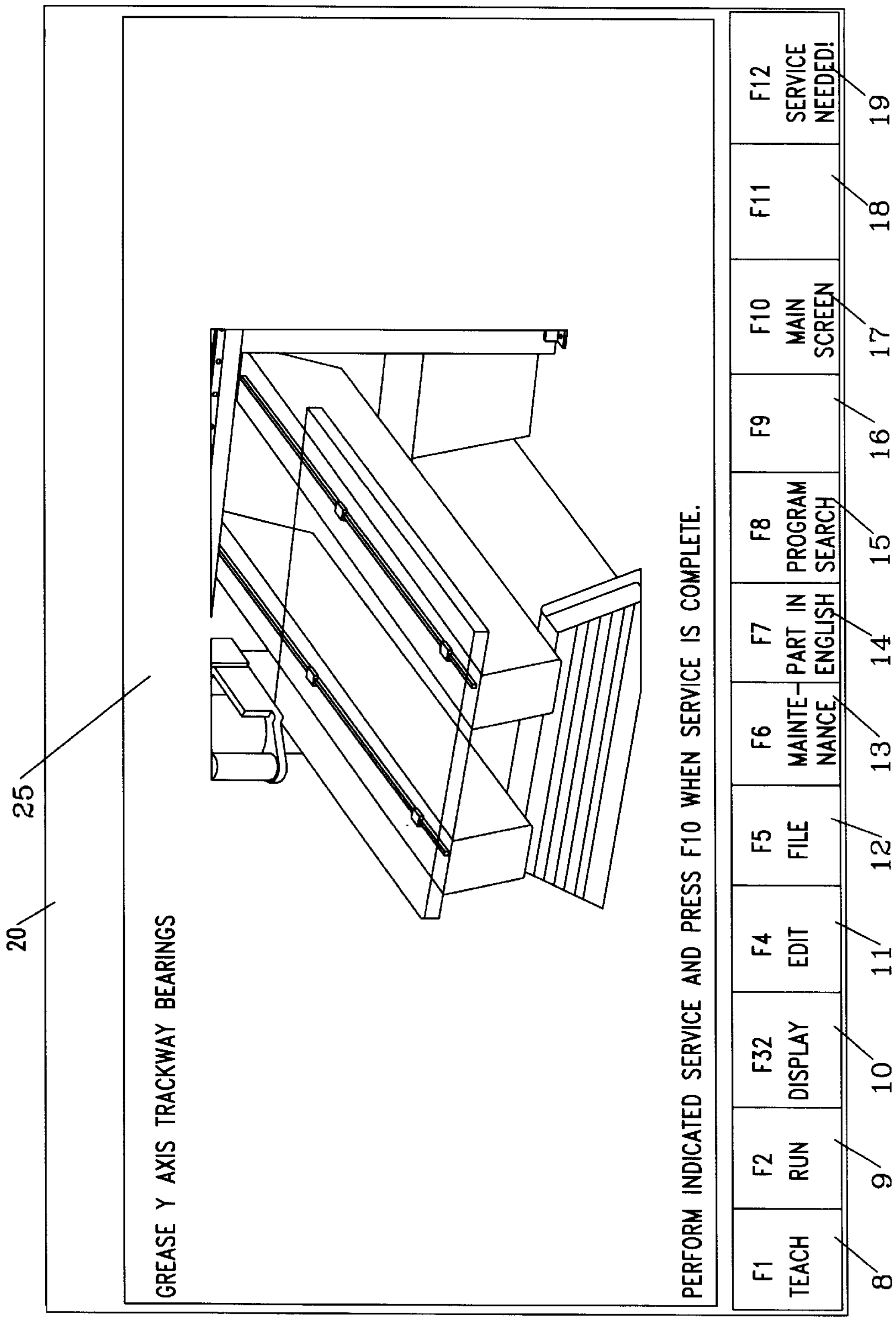
FIG. 11 shows an illustration of a graphical display screen of the CNC machine tool control of the present invention showing the Y axis trackway bearings.

FIG. 11 shows Y Axis Trackway Bearings in need of grease and graphic display 25 indicating the location of the Y Axis Trackway Bearings. When service for Y-Axis Trackway Bearings is performed by an operator, the operator presses F10 key 17 which returns the operator to the main screen as shown in FIG. 6. Upon returning to main screen as shown in FIG. 6, the maintenance record is updated and the Maintenance Schedule is set for the next cycle value.

Figure 12:
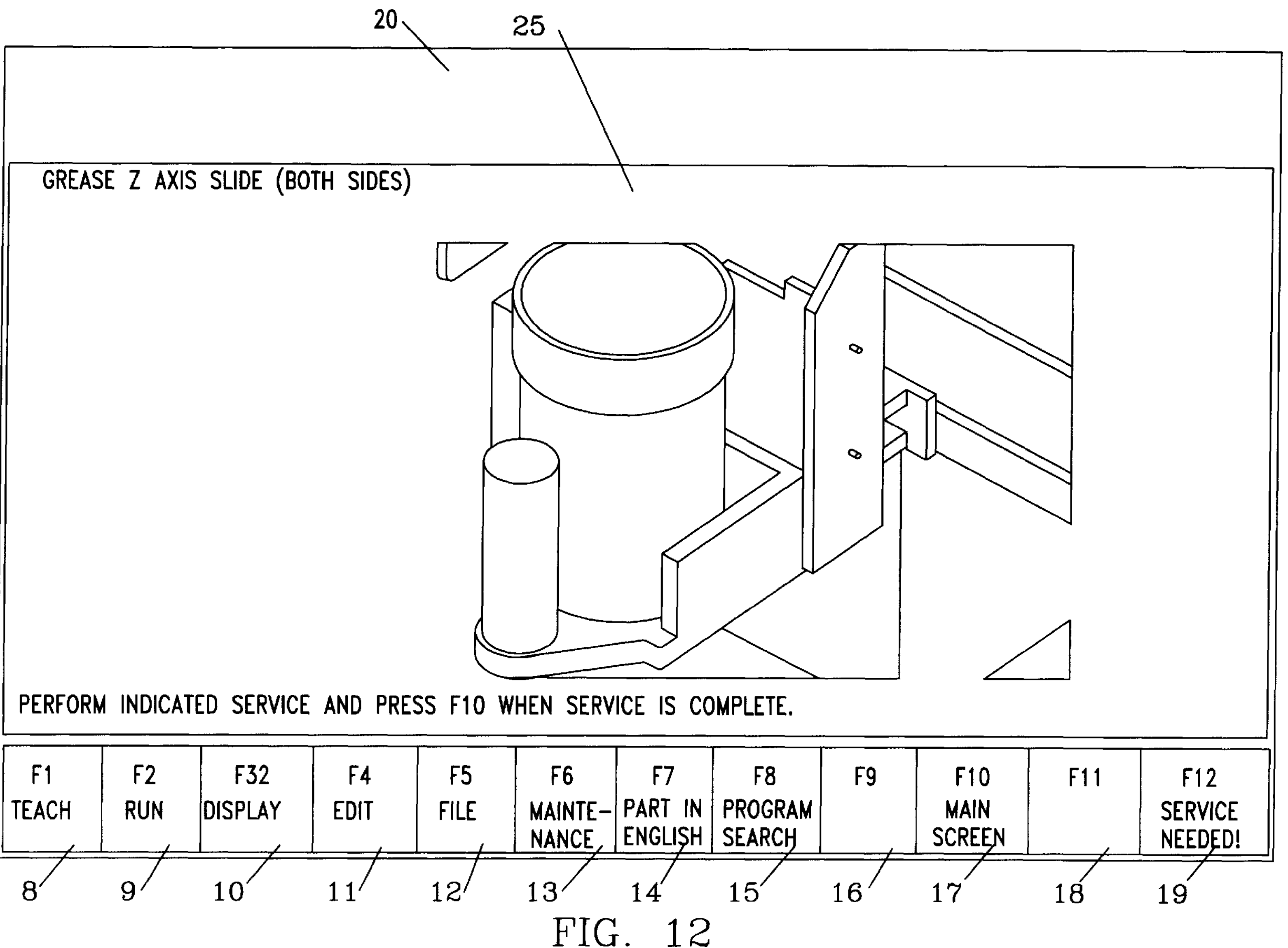
FIG. 12 shows another illustration of a graphical display screen of the CNC machine tool control of the present invention showing the Z axis slide.

FIG. 12 shows the Z-Axis slide on graphics 25 on display screen 20 for the purpose of lubrication.

Figure 13:
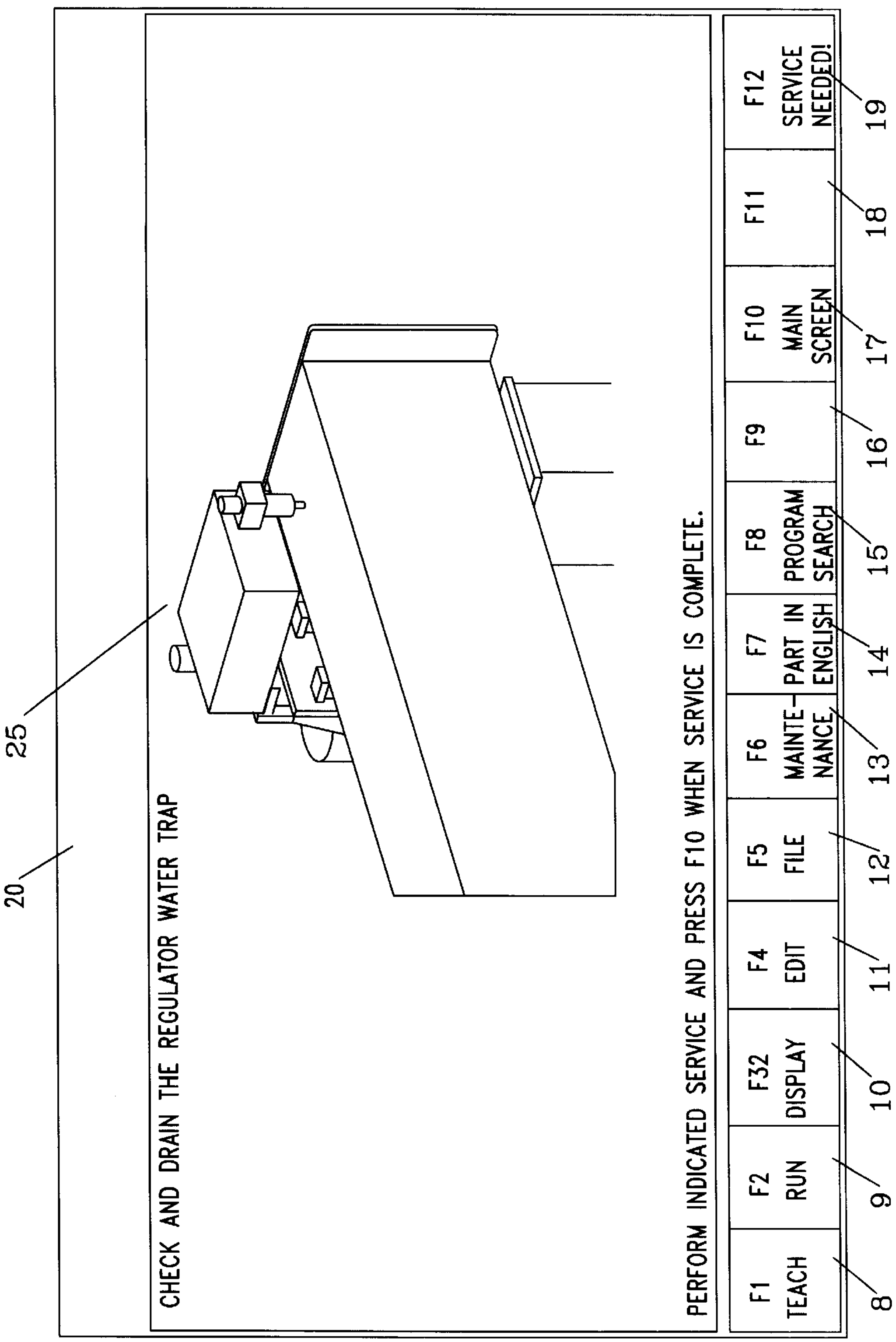
FIG. 13 shows another illustration of a graphical display screen of the CNC machine tool control of the present invention showing the Regulator Water Trap.

FIG. 13 shows the Regulator Water Trap in graphics 25 on display screen 20 for the purpose of inspection and draining.

Figure 14:
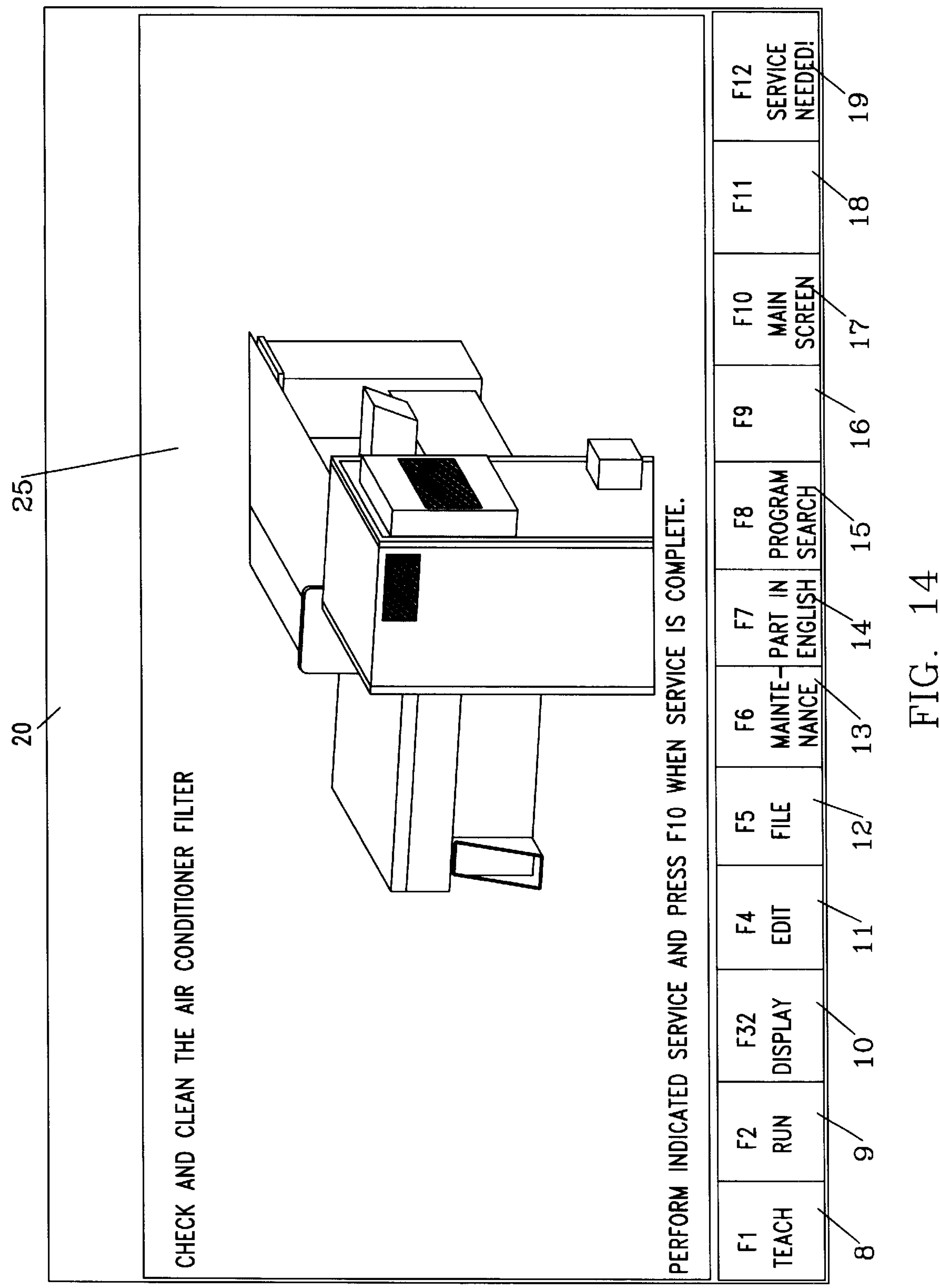
FIG. 14 shows another illustration of a graphical display screen of the CNC machine tool control of the present invention showing the Air Conditioner Filter.

FIG. 14 shows the location of the Air Conditioner Filter in graphical display 25 on display screen 20 for the purposes of checking and cleaning.

Note in each of the FIGS. 10 through 14, the machine is shown in a manner allowing the viewer to see through any obstructing portions of the tool and view the part of interest in relation to the rest of the machine. Such a view provides a service technician with spatial cues about the placement and orientation of the part on the machine such that maintenance can be facilitated.

Figure 15:
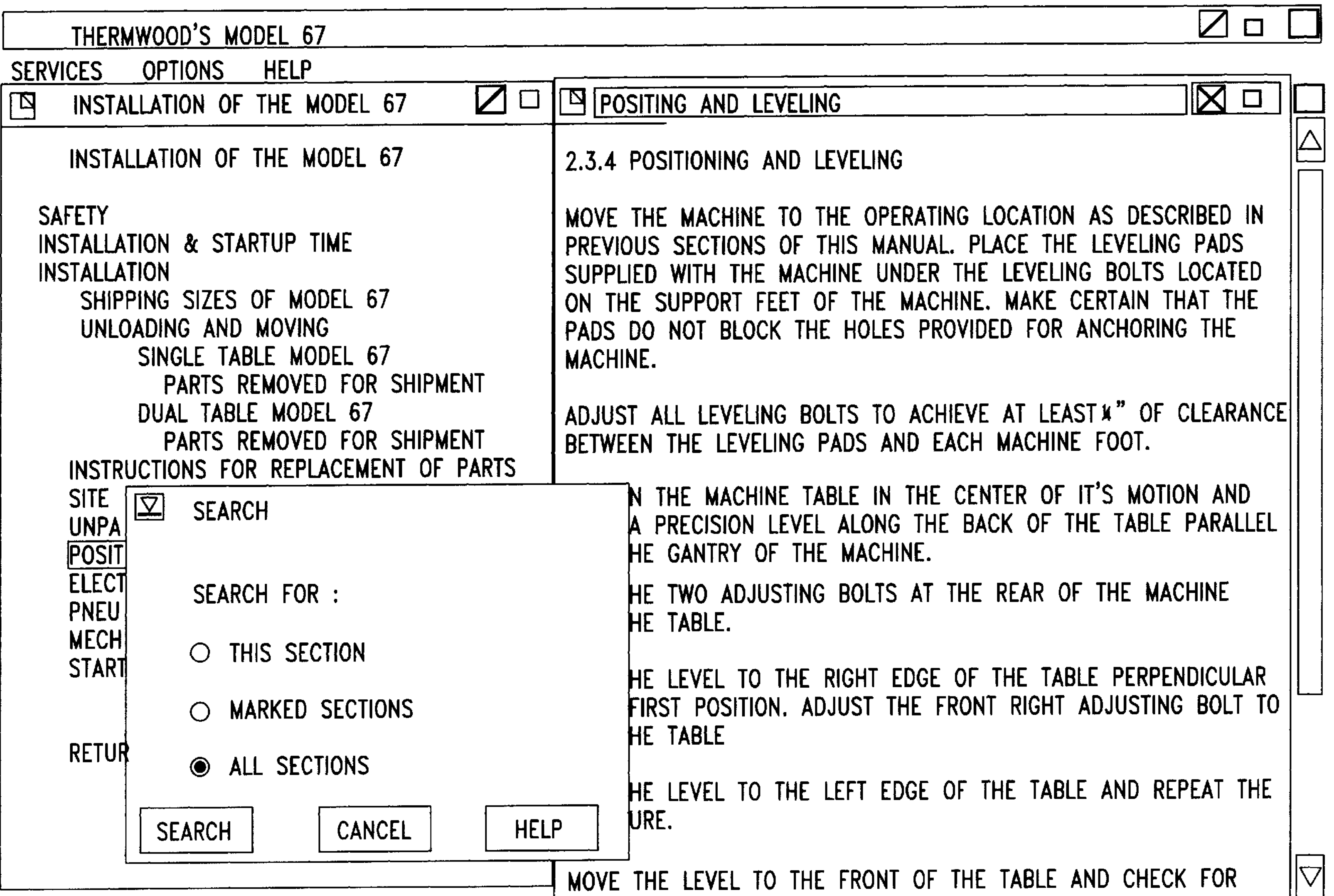
FIG. 15 shows an illustration of a search function of the CNC machine tool control of the present invention.

In a situation where an operator needs to search for instructions regarding a particular function from the electronic service manual, the operator can input key words through input devices. Once the sought after instructions are obtained, they appear on display screen 20, as shown in FIG. 15.

If any aspect of the instruction contains audio/video portions, they will be displayed on display screen 20, as shown in FIG. 16.

It should be noted that not all maintenance works can be scheduled in advance. Random events including various types of malfunctions can create an immediate need for intervention. For these reasons, the PLC can monitor hundreds of machine conditions and will send a "hotspot event message" to the mmc service thread if necessary.

The following discussion shall be explained in corroboration with a file titled "MACHINE.RC". This file contains numerous sections. The "BITMAP ID Section is shown in FIG. 17, the "Hot Spot Definition Section" is shown in FIG. 18, and the "MCLOCK Definition Section" is shown in FIG. 19. Associated with the "MCLOCK Definition Section" is a file titled "MCLOCK.TXT", which is shown in FIG. 20. The "Event Group Definition Section" is shown in FIG. 21.

Assuming a hot spot event 3 occurred due to a need to lubricate an X-axis trackway bearings after 12 hours of run time.

The cnc service thread, which is run every 32 milliseconds, checks the PLC (Programmable Logic Controller) shared memory to see if service event #3 is enabled. If the X-axis moving event #3 is enabled, the clock for event #3 is decreased by the amount of elapse time since the previous inspection. After running the X axis for 12.0 hours, the remaining time derived by using 12 hours minus the amount of elapse time should be equal to or less than zero. A "service needed message" associated with event #3 is posted to the mmc service thread. At this time, the Update File clock is also checked. If 30 seconds has elapsed since the last Service Clock History File, the "Mclock Txt" will be updated. "Mclock Txt" is an ASCII file, which can be read with any test editor. A service personnel can view this file to learn when was service required and performed.

Eventually the mmc service thread, which is run every 32 milliseconds, checks its system queue and finds a "service needed message". The words "SERVICE NEEDED" are displayed in red on the F12 menu button face. Obviously, the operator will not be quick enough to respond with an F12 key closure during the first interrupt with "a service needed message". After a few seconds, the operator will have time to notice the message and respond, or he may chose not to respond until later. The "SERVICE NEEDED MESSAGE" will stay until the operator does respond with an F12 key closure.

When the operator finally does press the F12 key and the mmc service thread sees an "F12 key closure message" in the system queue, the following events will take place:

a.) The graphic file associated (in the Machine.Rc) with event#3 will be loaded from the disk. This will be a picture of the X axis trackway. This graphic will be displayed;

b.) The service instruction message associated (in the file Machine.RC) with the event #3, "Grease X Axis Trackway Bearings", will be loaded and displayed.

Specifically, the controller looks into the "BITMAP ID Section" to obtain an identification of this event. In this situation, the proper identification is found to be "BITMAP ID-EVENT7\system\bitmaps\model-40\c40-1\C40-XTrackwaysZ.bmp".This identification, among other things, provides the proper address leading to the proper graphical template to be retrieved and displayed on a display screen, such as the Maintenance Schedule View 26 as shown in FIG. 9 as an example.

From the "MCLOCK Definition Section", the controller finds the event message to be "Grease X-Axis Trackway Bearings @12.0,1"". A first portion ofthe message "Grease X Axis Trackway Bearings" will be displayed in Box 27 of FIG. 9 to signify what needs to be done. The second portion of the message "12.0" will be displayed in box 28 of FIG. 9 to signify that the identified bearings should be greased every 12 hours.

From the "MCLOCK.TXT" file, the controller finds the appropriate event history messages and correspondingly display them in boxes 29*a*–29*d* of FIG. 9. This message informs an operator the maintenance history of the identified bearings.

From the "Event Group Definition Section", the controller finds the event group to be classified as a "2", thereby displaying "2" in box 34 of FIG. 9. This tells the system and an operator that when a clock time-out occurs to any event in group 2, all events in the same group will be coerced into a time-out as well. In this case, by grouping event time-outs together, all axes trackways will be lubricated at the same time.

After the service has been performed. The operator should press the F10 key. This will cause the X axis trackway graphic to be removed from the display. The "time-out clock" for event #3 will then be reset to 12.0 hours.

From the foregoing detailed description, it will be evident that there are a number of changes, adaptations and modifications of the present invention which come within the province of those persons having ordinary skill in the art to which the aforementioned invention pertains. For example, while the present invention, as disclosed, pertains to CNC machine tools, the present invention may be adapted to any machine with serviceable parts requiring periodic service and integrated training capabilities. However, it is intended that all such variations not departing from the spirit of the invention be considered as within the scope thereof as limited solely by the appended claims.

We claim:

1. A controller of a CNC machine, comprising:

a processing device, a storage device, an input device, a first input/output device, a second input/output device, a display device, and a sound reproduction device being connected together through a communication system;

a machine program, a distance table and a time table being stored in the storage device;

the processing device upon executing the machine program decodes the machine program into distance-data and running-time data for directing a cutting tool to travel along an axis of the CNC machine;

wherein the distance-data and the running-time data being correspondingly accumulated in the distance table and the time table.

2. The controller of claim 1, wherein the storage device further comprises an electronic maintenance manual.

3. The controller of claim 2, wherein the display device displays a template of the electronic maintenance manual once the controller receives a request from the input device.

4. The controller of claim 2, wherein the display device displays a maintenance schedule view window once the controller receives a request through the input device.

5. The controller of claim 4, wherein the maintenance schedule view window further comprises an event-description box, a group box, a cycle-time box, an event-history box and a time-remaining box.

6. The controller of claim 5, wherein a plurality of events being selectable from an event-history data key, whereby the event-description box, the group box, the cycle-time box, the event-history box and the time-remaining box each correspondingly display relevant data pertaining to a selected event.

7. The controller of claim 5, wherein the controller being updated by inputting information into the event-description box, the group box, the cycle-time box, the event-history box and the time-remaining box through the input device.

8. The controller of claim 2, wherein the electronic maintenance manual further comprises a hypertext search feature.

9. The controller of claim 2, wherein the display device displays a template of the electronic maintenance manual once one of a value contained in the distance table reaches a distance threshold value and a value contained in the time table reaches a time threshold value.

10. The controller of claim 2, wherein a warning signal being produced through the sound reproduction device once one of a value contained in the distance table reaches a distance threshold value and a value contained in the time table reaches a time threshold value.

11. The controller of claim 10, wherein the display device displays a screen comprising a flashing service-needed message.

12. The controller of claim 11, wherein the screen further comprises a graphical representation depicting a trouble area of the CNC machine, a message suggesting corrective actions, and a plurality of option keys.

13. The controller of claim 2, wherein the storage device further comprises a plurality of threshold values each pertaining to one aspect of the CNC machine.

14. The controller of claim 13, wherein a same group value is assigned to the plurality of threshold values having a same number.

15. The controller of claim 14, wherein the display device sequentially displays graphical representations depicting different areas of the CNC machine having a same group number once a threshold value of that group number has been reached.

16. The controller of claim 1, wherein the distance table stored with a predetermined distance value and the time table stored with a predetermined time value correspondingly and accumulatively subtract the distance data and the time-running data.

17. The controller of claim 2, wherein the display device displays a video clip once the controller receives a request from the input device.

18. A method of monitoring a CNC machine with a controller, comprising the steps of:

executing a machine program by a processing device;

decoding the machine program into a distance-data and a running-time data for directing a cutting tool to travel along an axis of the CNC machine;

accumulating the distance-data in a distance table; and accumulating the running-time data in a time table.

19. The method of claim 18 further comprises a step of:

storing an electronic maintenance manual into a storage device.

20. The method of claim 19 further comprises a step of:

displaying a template of the electronic maintenance manual on a display device once the controller receives a request from an input device.

21. The method of claim 19 further comprises a step of:

displaying a maintenance schedule view window once the controller receives a request through an input device.

22. The method of claim 21 further comprises a step of:

displaying an event-description box, a group box, a cycle-time box, an event-history box and a time-remaining box in the maintenance schedule view window.

23. The method of claim 22 further comprises a step of:

selecting one of a plurality of events from an event-history data key; and displaying relevant data of the selected event in the event-description box, the group box, the cycle-time box, the event-history box and the time-remaining box.

24. The method of claim 22 further comprises a step of:

updating the controller by inputting information into the event-description box, the group box, the cycle-time box, the event-history box and the time-remaining box through an input device.

25. The method of claim 19 further comprises a step of:

searching the electronic maintenance manual with a hypertext search feature.

26. The method of claim 19 further comprises a step of:

displaying a template of the electronic maintenance manual once one of a value contained in the distance table reaches a distance threshold value and a value contained in the time table reaches a time threshold value.

27. The method of claim 19 further comprises a step of:

producing a warning signal once one of a value contained in the distance table reaches a distance threshold value and a value contained in the time table reaches a time threshold value.

28. The method of claim 27 further comprises a step of:

displaying a screen comprising a flashing service-needed message.

29. The method of claim 28 further comprises a step of:

displaying a graphical representation depicting an area of the CNC machine, a message suggesting corrective actions, and a plurality of option keys on the screen.

30. The method of claim 19 further comprises a step of:

storing a plurality of threshold values each pertaining to one aspect of the CNC machine.

31. The method of claim 30 further comprises a step of:

assigning a same group number to the plurality of threshold values having a same number.

32. The method of claim 31 further comprises a step of:

sequentially display graphical representations depicting different areas of the CNC machine having a same group number once a threshold value of that group number has been reached.

33. The method of claim 18 further comprises a step of:

accumulatively subtracting the distance data and the time-running data correspondingly from a predetermined distance value stored in the distance table and a predetermined time value stored in the time table.

34. The method of claim 19 further comprises a step of:

displaying a video clip on a display device once the controller receives a request from an input device.

35. A controller of a CNC machine, comprising:

a processing device, a storage device, an input device, a first input/output device and a second input/output device being connected together through a communication system;

a distance table and a time table being stored in the storage device;

a transducer being connected to a motor of the CNC machine and the first input/output device;

the transducer inputting rotation data of the motor to the controller upon a motor-run;

the processing device calculates a distance data and a running-time data based on at least one characteristic of a transmission and the rotation data;

wherein the distance table and the time table correspondingly accumulate the distance-data and the running-time data.

36. A method of monitoring a CNC machine, comprising the steps of:

collecting rotation data of a motor of the CNC machine;

calculating a distance data and a time data based on the rotation data and at least one characteristic of a transmission;

accumulating the distance-data in a distance table; and accumulating the running-time data in a time table.

37. A controller of a CNC machine, comprising:

a processing device, a storage device, an input device, a first input/output device and a second input/output device being connected together through a communication system;

a machine program, a first distance table, a second distance table, a first time table and a second time table being stored in the storage device;

the processing device upon executing the machine program decodes the machine program into program distance data and program running-time data for directing a cutting tool to travel along an axis of the CNC machine;

the first distance table and the first time table correspondingly accumulate the program distance-data and the program running-time data;

a transducer being connected to a motor of the CNC machine and the first input/output device;

the transducer inputting rotation data of the motor to the controller upon a motor-run;

the processing device calculates a machine distance data and a machine running-time data based on the rotation data and at least one characteristic of a transmission;

the second distance table and the second time table correspondingly accumulate the distance data and the running-time data;

wherein the processing device compares a content of the first distance table with a content of the second distance table, and compares a content of the first running-time table with a content of the second running-time table.

38. The controller of claim 37, wherein the storage device further comprises an electronic maintenance manual.

39. The controller of claim 38, wherein the display device displays a template of the electronic maintenance manual once one of a distance comparison result does not fall within a predetermined distance boundary and one of a time comparison result does not fall within a predetermined time boundary.

40. The controller of claim 38, wherein a warning signal being produced through the sound reproduction device once one of a distance comparison result does not fall within a predetermined distance boundary and one of a time comparison result does not fall within a predetermined time boundary.

41. A method of monitoring a CNC machine, comprising the steps of:

executing a machine program by a processing device;

decoding the machine program into a program distance data and a program running-time data for directing a cutting tool to travel along an axis of the CNC machine;

accumulating the program distance data in a first distance table;

accumulating the program running-time data in a first time table;

collecting rotation data from a CNC machine motor;

calculating a machine distance data and a machine time data based on the rotation data and at least one characteristic of a transmission;

accumulating the machine distance data in a second distance table;

accumulating the machine running-time data in a second time table; and comparing a content of the first distance table with a content of the second distance table, and comparing a content of the first time table with a content of the second time table.

42. The method of claim 41 further comprises a step of:

storing an electronic maintenance manual into a storage device.

43. The method of claim 42 further comprises a step of:

displaying a template of the electronic maintenance manual once one of a distance comparison result does not fall within a predetermined distance boundary and a time comparison result does not fall within a predetermined time boundary.

44. The method of claim 42 further comprises a step of:

producing a warning signal once one of a distance comparison result does not fall within a predetermined distance boundary and a time comparison result does not fall within a predetermined time boundary.

* * * * *